(12) United States Patent
Iyatani

(10) Patent No.: US 9,616,866 B2
(45) Date of Patent: Apr. 11, 2017

(54) VEHICULAR BRAKE HYDRAULIC PRESSURE CONTROL APPARATUS

(71) Applicant: NISSIN KOGYO CO., LTD., Ueda-shi, Nagano (JP)

(72) Inventor: Masatoshi Iyatani, Ueda (JP)

(73) Assignee: Autoliv Nissin Brake Systems Japan Co., Ltd., Nagano (JP)

( * ) Notice: Subject to any disclaimer, the term of this patent is extended or adjusted under 35 U.S.C. 154(b) by 144 days.

(21) Appl. No.: 14/760,063

(22) PCT Filed: Jan. 23, 2014

(86) PCT No.: PCT/JP2014/051388
§ 371 (c)(1),
(2) Date: Jul. 9, 2015

(87) PCT Pub. No.: WO2014/115809
PCT Pub. Date: Jul. 31, 2014

(65) Prior Publication Data
US 2015/0353065 A1    Dec. 10, 2015

(30) Foreign Application Priority Data
Jan. 25, 2013    (JP) .................................. 2013-012525

(51) Int. Cl.
*B60T 8/36*    (2006.01)
*B60T 13/68*    (2006.01)
*B60T 8/48*    (2006.01)

(52) U.S. Cl.
CPC ............ *B60T 8/368* (2013.01); *B60T 13/686* (2013.01); *B60T 8/4872* (2013.01)

(58) Field of Classification Search
CPC .......... B60T 8/341; B60T 8/344; B60T 8/346; B60T 8/3675; B60T 8/368; B60T 8/4872; B60T 13/686
See application file for complete search history.

(56) References Cited

U.S. PATENT DOCUMENTS 6,234,189 B1 *  5/2001  Koch ..................... F23K 5/007
                                                 137/614.11
8,523,295 B2    9/2013  Bareiss et al.
                (Continued)

FOREIGN PATENT DOCUMENTS

CN    101795909 A    8/2010
CN    101808868 A    8/2010
                (Continued)

OTHER PUBLICATIONS

Extended European Search Report issued on Aug. 1, 2016 for European Patent Application No. 14743737.0.
(Continued)

*Primary Examiner* — Anna Momper
(74) *Attorney, Agent, or Firm* — Carrier Blackman & Associates, P.C.; Joseph P. Carrier; William D. Blackman

(57) ABSTRACT

Inlet and outlet ports are in the top part of a base; a reservoir is in the bottom part of the base; pumps are between the inlet port and the reservoir; a pressure booster valve, a depressurizing valve, a cut valve, and a caliper pressure sensor are along the center axis of each pump; the pressure booster valve is above the center axis; the depressurizing valve is below the center axis; the cut valve is between the pressure booster valve and the depressurizing valve and is nearer the middle of the base than the pressure booster valve and the depressurizing valve; and a suction valve is between the depressurizing valves aligned nearer the end of the base than a vertical reference line passing through the rotational center axes of the pumps. The suction valve communicates with cut valves, and a master pressure sensor is on the reference line.

10 Claims, 20 Drawing Sheets

(56) References Cited

U.S. PATENT DOCUMENTS

| | | | |
|---|---|---|---|
| 2006/0055232 A1* | 3/2006 | Koyama | B60T 8/3685 303/10 |
| 2006/0220768 A1* | 10/2006 | Iyatani | B60T 8/368 335/78 |
| 2007/0096553 A1* | 5/2007 | May | B60T 8/368 303/119.3 |
| 2008/0088176 A1* | 4/2008 | Ota | B60T 8/3675 303/155 |
| 2008/0230337 A1* | 9/2008 | Kajiyama | B60T 1/10 188/352 |
| 2008/0258544 A1* | 10/2008 | Iyatani | B60T 8/368 303/10 |
| 2010/0219026 A1 | 9/2010 | Fukasawa et al. | |
| 2010/0276925 A1 | 11/2010 | Bareiss et al. | |
| 2010/0283315 A1 | 11/2010 | Isono | |
| 2011/0036434 A1 | 2/2011 | Fischbach-Borazio et al. | |
| 2011/0036463 A1 | 2/2011 | Miyanishi et al. | |
| 2011/0047999 A1* | 3/2011 | Koyama | B60T 8/368 60/459 |
| 2011/0062776 A1* | 3/2011 | Fischbach-Borazio | B60T 8/368 303/116.1 |
| 2013/0057052 A1 | 3/2013 | Kunz et al. | |

FOREIGN PATENT DOCUMENTS

| | | |
|---|---|---|
| CN | 102026853 A | 4/2011 |
| CN | 102317490 A | 1/2012 |
| CN | 102781744 A | 11/2012 |
| JP | 2010-280269 A | 12/2010 |
| JP | 2010-540332 A | 12/2010 |
| JP | 4760595 B2 | 8/2011 |

OTHER PUBLICATIONS

Office Action issued Sep. 1, 2016 to corresponding Chinese Patent Application No. 201480005190.4.

* cited by examiner

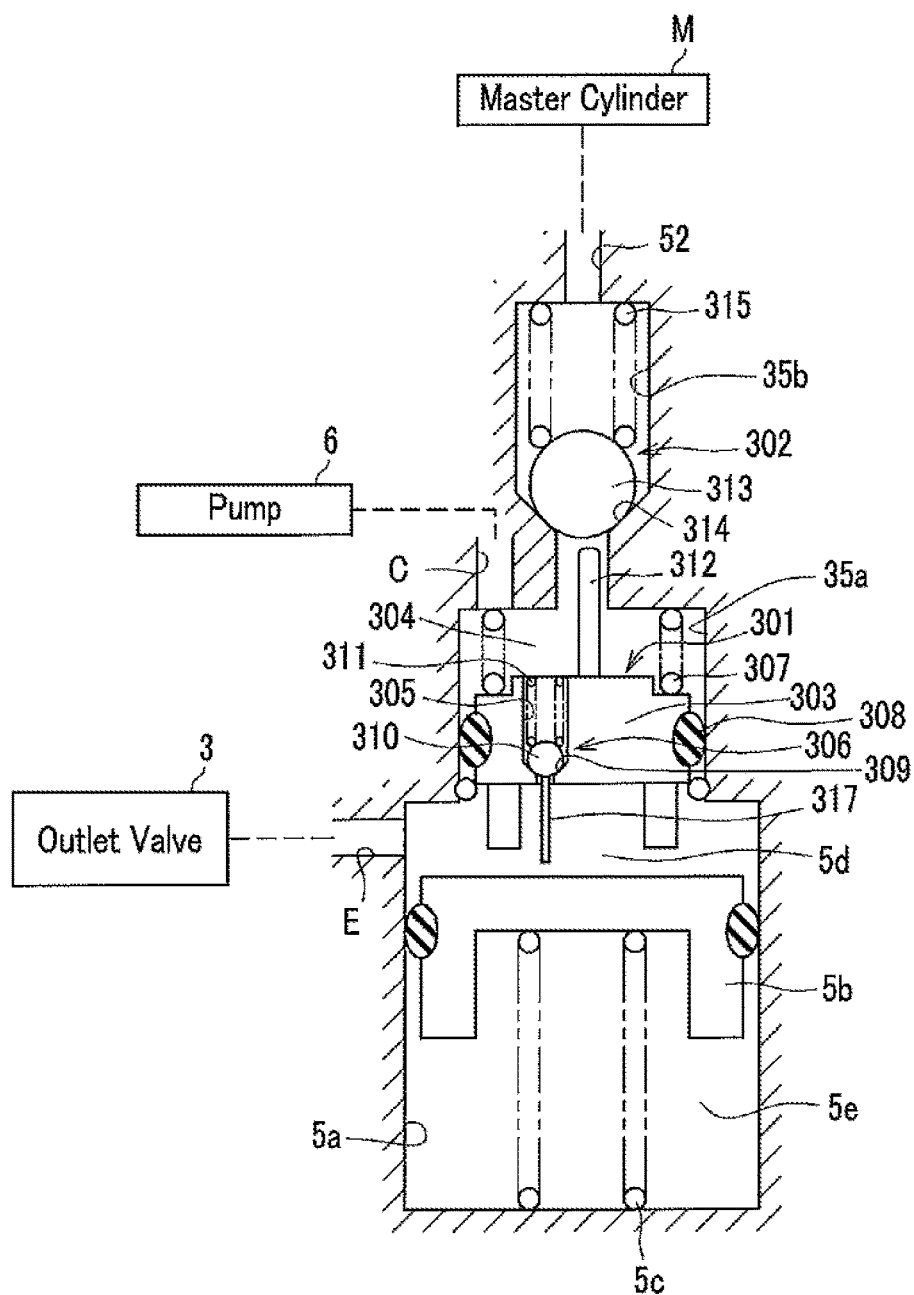

VEHICULAR BRAKE HYDRAULIC PRESSURE CONTROL APPARATUS

TECHNICAL FIELD

The present invention relates to a vehicular brake hydraulic pressure control apparatus for use in vehicles (e.g., cars, motorcycles, motor tricycles, all-terrain vehicles (ATVs)).

BACKGROUND ART

Conventionally, the vehicular brake hydraulic pressure control apparatus as above has a base body, fluid lines through which brake fluid flows are formed in the base body, and solenoid valves, pumps, and the like for controlling the flow of the brake fluid are installed in the base body. (See, for example, Patent Literature 1.)

CITATION LIST

Patent Literature

Patent Literature 1: Registered Japanese Patent No. 4760595

SUMMARY OF INVENTION

Technical Problem

Incidentally, the traffic-congestion follow-up function is receiving attention as a traveling function of a vehicle on which a vehicular brake hydraulic pressure control apparatus is mounted. The traffic-congestion follow-up function causes the vehicle to start and stop in response to start and stop of a preceding car during road congestion. When control for the traffic-congestion follow-up is performed, smooth stopping of the vehicle is required. In addition, in order to strictly control the caliper pressure, additional arrangement of a caliper-pressure sensor in the vehicular brake hydraulic pressure control apparatus is required. However, the additional arrangement of the caliper-pressure sensor is likely to increase the dimensions of the base body.

The object of the present invention is to solve the above problems, and provide a vehicular brake hydraulic pressure control apparatus which is provided with a caliper-pressure sensor and enables downsizing of the base body.

Solution to Problem

In order to accomplish the above object, according to the present invention, a vehicular brake hydraulic pressure control apparatus is provided. The vehicular brake hydraulic pressure control apparatus includes a base body, a plurality of pressure-increasing valves, a plurality of pressure-reducing valves, a master-pressure sensor, a pair of reservoirs, a pair of cut valves, a pair of pumps, a pair of mechanical suction valves, a pair of caliper-pressure sensors, and a motor. In vehicular brake hydraulic pressure control apparatus: one side of the base body is a valve-mounting side on which the plurality of pressure-increasing valves, the plurality of pressure-reducing valves, the pair of cut valves, and the pair of caliper-pressure sensors are mounted, and another side of the base body opposite to the one side is a motor-mounting side on which the motor is mounted; the plurality of pressure-increasing valves are arranged in a line in a direction of center axes of the pumps, the plurality of pressure-reducing valves are arranged in a line in the direction of the center axes of the pumps, and the pair of cut valves and the pair of caliper-pressure sensors are arranged in a line in the direction of the center axes of the pumps; when a direction perpendicular to the direction of the center axes of the pumps and a rotational center axis of the motor is a vertical direction, an inlet port from a hydraulic pressure source and a plurality of outlet ports to be connected to a plurality of wheel brakes are arranged in an upper portion of the base body, and the pair of reservoirs are arranged in a lower portion of the base body, where the lower portion is located opposite to the upper portion with respect to the center axes of the pumps; the pair of pumps are respectively arranged between the inlet port and the reservoirs; the plurality of pressure-increasing valves are respectively arranged above the center axes of the pumps; the plurality of pressure-reducing valves are respectively arranged below the plurality of pressure-increasing valves; the pair of cut valves are respectively arranged between the pressure-increasing valves and the pressure-reducing valves, and are located nearer to a central portion of the base body than ones of the pressure-increasing valves and ones of the pressure-reducing valves located on edge sides of the base body; the mechanical suction valves are each arranged between ones of the pressure-reducing valves which are arrayed in the direction of the center axes of the pumps on an edge side of a vertical reference line passing through the rotational center axis, and the pair of mechanical suction valves respectively communicate with the pair of cut valves; and the master-pressure sensor is arranged on the vertical reference line above ones of the pressure-increasing valves located adjacent to each other, in the direction of the center axes of the pumps, in a central portion of the base body.

In the above vehicular brake hydraulic pressure control apparatus, the pair of cut valves are arranged in a line in the direction of the center axes of the pumps, the pair of caliper-pressure sensors are arranged in a line in the direction of the center axes of the pumps, the plurality of pressure-increasing valves are arranged in a line in the direction of the center axes of the pumps, and the plurality of pressure-reducing valves are arranged in a line in the direction of the center axes of the pumps. In addition, the pair of mechanical suction valves are each arranged between ones of the pressure-reducing valves. Therefore, the sensors and valves can be arranged by effectively using the spaces between the pressure-reducing valves, so that the dimension of the base body in the vertical direction can be reduced.

Since the pair of cut valves are arranged nearer to a central portion of the base body than ones of the pressure-increasing valves and ones of the pressure-reducing valves located on edge sides of the base body, it is possible to avoid the arrangement in which the pair of cut valves are aligned, in the vertical direction, with the pressure-increasing valves and the pressure-reducing valves. Thus, the dimension of the base body in the vertical direction can be reduced.

In addition, since the master-pressure sensor is arranged on the vertical reference line above ones of the pressure-increasing valves located adjacent to each other, the space in the upper portion of the base body can be saved, so that the dimension of the base body in the vertical direction can be reduced.

A preferable additional feature of the present invention is that the pair of caliper-pressure sensors are arranged to cross the fluid lines of ones of the outlet ports which are arranged near to a central portion of the base body.

In the vehicular brake hydraulic pressure control apparatus having the above feature, it is possible to make the caliper-pressure sensors directly communicate with the fluid lines of ones of the outlet ports. Therefore, the fluid lines can be simplified, and the base body can be downsized. In addition, the simplification of the fluid lines enables cost reduction.

Another preferable additional feature of the present invention is that the pair of mechanical suction valves each include a large-diameter housing portion and a small-diameter housing portion, the large-diameter housing portion is directly connected to one of the pumps, and the small-diameter housing portion is directly connected to one of the cut valves.

In the vehicular brake hydraulic pressure control apparatus having the above feature, the fluid lines between the pair of mechanical suction valves and the pair of pumps and between the pair of mechanical suction valves and the pair of cut valves can be dispensed with, so that the fluid lines can be simplified and the base body can be downsized.

Yet another preferable additional feature of the present invention is that the vehicular brake hydraulic pressure control apparatus further includes a damper connected to the pumps, and the damper is arranged on the motor-mounting side.

In the vehicular brake hydraulic pressure control apparatus having the above feature, the damper can be arranged by effectively using part of the motor-mounting side as a dead space of the base body. Therefore, the base body can be downsized. In addition, silence during normal range control can be achieved by the damper effect.

A further preferable additional feature of the present invention is that the motor is sealed to the motor-mounting side with a sealing member, and the damper is arranged in a region of the motor-mounting side which is sealed with the sealing member.

In the vehicular brake hydraulic pressure control apparatus having the above feature, the damper is hidden by the mounting of the motor. Therefore, anti-rust processing and the like of the sealing plug of the damper are unnecessary, so that the cost of the damper can be reduced.

A yet further preferable additional feature of the present invention is that the damper is arranged nearer to the inlet port than the center axes of the pumps, a portion of a fluid line connecting the pumps and the damper is formed from a bottom side of the base body toward a top side of the base body, and a portion of a fluid line connecting the damper and the cut valves is formed from the top side of the base body toward the bottom side of the base body.

In the vehicular brake hydraulic pressure control apparatus having the above feature, the two fluid lines connected to the damper can be formed from respectively different (top and bottom) sides of the base body. Therefore, the fluid lines can be easily formed, and the fluid lines around the damper can be simplified.

Effect of Invention

According to the present invention, a vehicular brake hydraulic pressure control apparatus which includes a caliper-pressure sensor and can be downsized can be obtained.

BRIEF DESCRIPTION OF DRAWINGS

FIG. 2A is a plan view, FIG. 2B is a front view, and FIG. 2C is a side view.

FIG. 3A is a rear view, and FIG. 3B is a bottom view.

FIG. 4 is a schematic view illustrating the structures of a suction valve and a reservoir.

DESCRIPTION OF EMBODIMENTS

Figure 1:
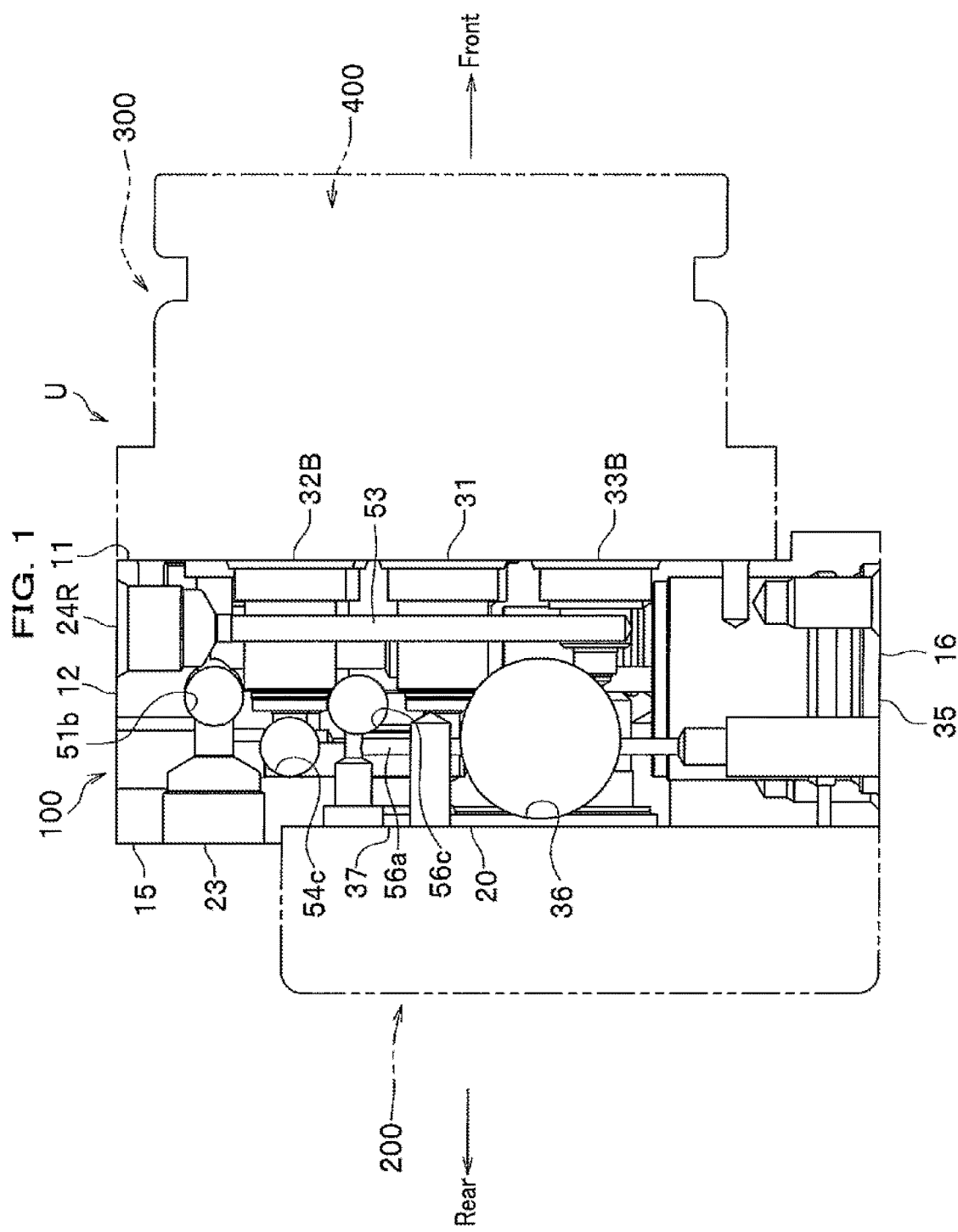
FIG. 1 is a side cross-sectional view of a vehicular brake hydraulic pressure control apparatus according to an embodiment of the present invention, where the inside of the base body of the vehicular brake hydraulic pressure control apparatus is visualized.

Hereinbelow, an embodiment of the present invention is explained in detail with reference to accompanying drawings. In the drawings, identical elements respectively bear identical reference numbers, and the same explanations are not repeated. In the following explanations, the term "up-down" is used on the assumption that an inlet port 21 and an outlet port 22L in a base body 100 (which are explained later) are located on the upper side, and a pair of reservoirs 5 are located on the lower side. However, this arrangement may not necessarily correspond to the actual installation condition. As illustrated in FIG. 1, the vehicular brake hydraulic pressure control apparatus according to the present embodiment (which may be hereinafter referred to as the brake hydraulic pressure control apparatus) U can be used four-wheel vehicles and the like. The brake hydraulic pressure control apparatus U is constituted by a base body 100, a motor (electric motor) 200, a control housing 300, and a control unit 400. The control housing 300 is mounted on the front side 11 (one side, a valve-mounting side) of the base body 100, and the motor 200 is mounted on the rear side 15 (another side, a motor-mounting side) of the base body 100. The control unit 400 is contained in the control housing 300.

Figure 20:
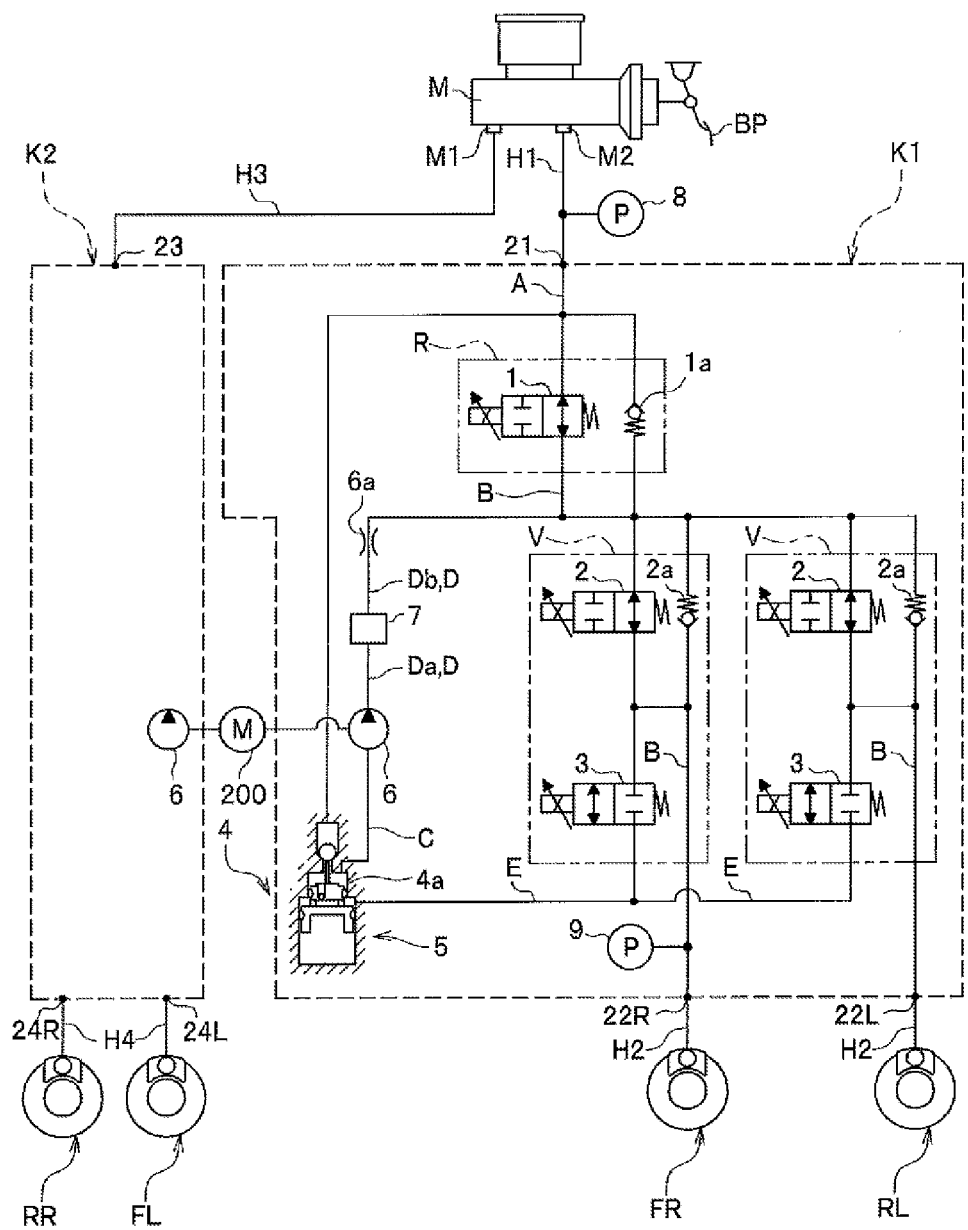
FIG. 20 is a hydraulic circuit diagram of the vehicular brake hydraulic pressure control apparatus according to the embodiment of the present invention.

The brake hydraulic pressure control apparatus U is a materialization of the hydraulic circuit illustrated in FIG. 20. The brake hydraulic pressure control apparatus U includes a brake output system K1 and a brake output system K2. The brake output system K1 is arranged for controlling the two wheel brakes FR and RL among the four wheel brakes FR, RL, FL, and RR, and the brake output system K2 is arranged for controlling the two other wheel brakes FL and RR among the four wheel brakes FR, RL, FL, and RR. Antilock braking control which is independent for each wheel is enabled by a control-valve unit V arranged for each of the four wheel brakes FR, RL, FL, and RR. (That is, two control-valve units are arranged for each of the brake output systems.) In addition, vehicle behavior control is enabled by cooperation of a regulator R, a (mechanical) suction valve 4, and a pump 6 which are arranged in each of the brake output systems K1 and K2.

In FIG. 20, the brake output system K1 is provided for braking the front right wheel and the rear left wheel, and is a system extending from the inlet port 21 to the outlet ports 22R and 22L. A piping arrangement H1 extending to an outlet port M2 of a master cylinder M (as a hydraulic pressure source) is connected to the inlet port 21, and piping arrangements H2 extending to the brake wheels FR and RL are connected to the outlet ports 22R and 22L, respectively.

The brake output system K2 is provided for braking the front left wheel and the rear right wheel, and is a system extending from an inlet port 23 to outlet ports 24L and 24R. A piping arrangement H3 extending to an outlet port M1 of the master cylinder M (as the same hydraulic pressure source as for the brake output system K1) is connected to the inlet port 23, and piping arrangements H4 extending to the brake wheels FL and RR are connected to the outlet ports 24L and 24R, respectively. Since the structure of the brake output system K2 is identical to the structure of the brake output system K1, the following explanations are focused on the brake output system K1, and the brake output system K2 is explained only when necessary.

The master cylinder M is a tandem type, and a brake pedal BP as a brake manipulator is connected to the master cylinder M. In other words, the four wheel brakes FR, RL, FL, and RR can be activated by only applying a pedal force to the single brake pedal BP.

In the brake output system K1, a regulator R including a cut valve 1, a plurality of control-valve units V, a suction valve 4, a reservoir 5, a pump 6, an orifice 6a, a damper 7, a hydraulic pressure source-side brake hydraulic pressure sensor (master-pressure sensor) 8, and a wheel-side brake hydraulic pressure sensor (caliper-pressure sensor) 9 are arranged.

In the following explanations, the fluid line (fluid path) extending from the inlet port 21 to the regulators R is referred to as "the output hydraulic pressure line A", and the fluid line (fluid path) extending from the regulators R to the outlet ports 22R and 22L is referred to as "the wheel hydraulic pressure line B". In addition, the fluid line extending from the output hydraulic pressure line A to the pump 6 is referred to as "the suction hydraulic pressure line C", the fluid line extending from the pump 6 to the wheel hydraulic pressure line B is referred to as "the discharge hydraulic pressure line D", and the fluid line extending from the wheel hydraulic pressure line B to the suction hydraulic pressure line C is referred to as "the release line E". Further, "the upstream side" means the master cylinder M side, and "the downstream side" means the wheel brakes FR and RL (or FL and RR) side.

Figure 2A:
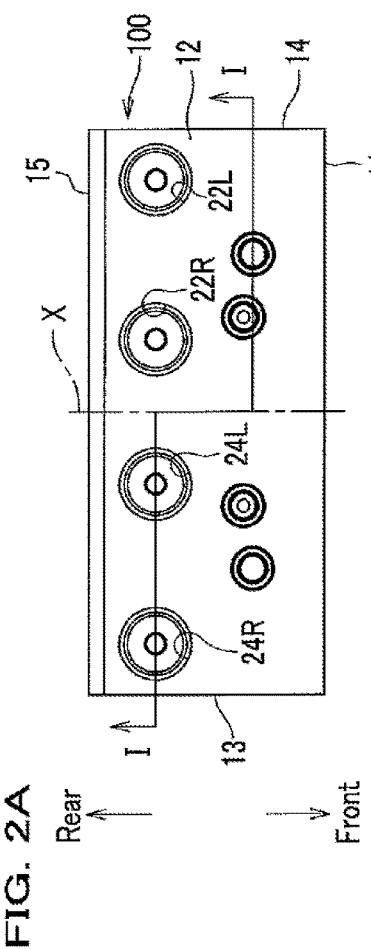
FIGS. 2A to 2C include diagrams illustrating the base body of the vehicular brake hydraulic pressure control apparatus according to the embodiment of the present invention, where
Figure 2B:
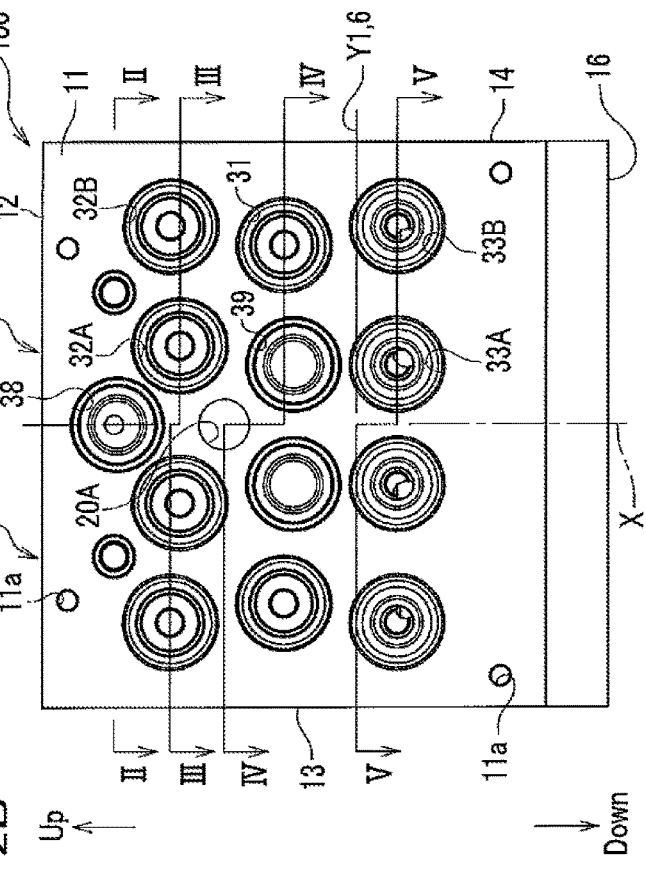

The regulators R has a function of switching between a state in which the brake fluid in the output hydraulic pressure line A is allowed to flow and a state in which the flow of the brake fluid in the output hydraulic pressure line A is shut off, and a function of controlling the brake hydraulic pressure in the wheel hydraulic pressure line B equal to or below a predetermined value when the flow of the brake fluid in the output hydraulic pressure line A is shut off. Each regulator R is constituted by the cut valve 1 and the check valve 1a. As illustrated in part of FIG. 2B, the regulator R is installed in a cut-valve installation hole 31, which is arranged in the base body 100. The cut-valve installation hole 31 is arranged between an outer inlet-valve installation hole 32B and an outer outlet-valve installation hole 33B above the pump center axis Y1 of a pump bore 36 in the up-down direction of the base body 100. (Hereinafter, the pump center axis Y1 is referred to as "the pump axis". In FIG. 2B and some other diagrams, the pump bore 36 is indicated by the pump axis Y1.) In addition, the cut-valve installation hole 31 is arranged in the base body 100 nearer to the center of the base body 100 than the center of the outlet port 22L in the direction of the pump axis Y1, where the outlet port 22L is one of the outlet ports 22L, 22R, 24L, and 24R in the brake output system K1 which is arranged nearer to an edge of the base body 100 in the direction of the pump axis Y1 (as illustrated in FIG. 2A).

Referring back to FIG. 20, the cut valve 1 is a normally-open type linear solenoid valve arranged between the output hydraulic pressure line A and the wheel hydraulic pressure line B, and switches between the state in which the flow of the brake fluid from the output hydraulic pressure line A to the wheel hydraulic pressure line B is allowed and the state in which the flow of the brake fluid from the output hydraulic pressure line A to the wheel hydraulic pressure line B is shut off. In other words, the cut valve 1 is configured to enable adjustment of the valve opening pressure by controlling energization of the solenoid (i.e., the cut valve 1 is configured to have the function of a relief valve). Since the cut valve 1 is normally open, the brake fluid which is discharged from the pump 6 into the discharge hydraulic pressure line D and then flows into the wheel hydraulic pressure line B is allowed to return (circulate) to the suction hydraulic pressure line C. When the brake pedal BP is manipulated, i.e., when a brake hydraulic pressure is applied to the wheel brakes FR and RL, the cut valve 1 is closed under control of the control unit 400 (as illustrated in FIG. 1), and the cut valve 1 can be adjusted by appropriately releasing to the suction hydraulic pressure line C side the brake hydraulic pressure in the wheel hydraulic pressure line B according to the balance between the brake hydraulic pressure applied from the output hydraulic pressure line A to the regulator R and the valve closing force controlled by energization of the solenoid.

The check valve 1a is connected in parallel to the cut valve 1. The check valve 1a is a one-way valve allowing the brake fluid to flow from the output hydraulic pressure line A to the wheel hydraulic pressure line B.

A control-valve unit V is arranged for each of the wheel brakes FR and RL. Each control-valve unit V is constituted by an inlet valve 2 as a pressure-increasing valve, a check valve 2a, and an outlet valve 3 as a pressure-reducing valve. Each control-valve unit V has a function of switching among a state in which the wheel hydraulic pressure line B is opened and an release line E is shut off (i.e., the state in the inlet valve 2 is opened and the outlet valve 3 is closed), a state in which the wheel hydraulic pressure line B is closed and the release line E is opened (i.e., the state in the inlet valve 2 is closed and the outlet valve 3 is opened), and a state in which the wheel hydraulic pressure line B and the release line E are closed (i.e., the state in the inlet valve 2 and the outlet valve 3 are closed).

The inlet valve 2 is a normally-open solenoid valve arranged in the wheel hydraulic pressure line B. The inlet valve 2 allows inflow of the brake fluid from the upstream side to the downstream side when the inlet valve 2 is open, and shuts off the inflow when the inlet valve 2 is closed. In the normally-open solenoid valve, an electromagnetic coil for actuating a valve element in the solenoid valve is electrically connected to the control unit 400. The normally-open solenoid valve is closed when the electromagnetic coil is energized on the basis of a command from the control unit 400, and opened when the electromagnetic coil is demagnetized. In the present embodiment, a linear solenoid type solenoid valve is used as each inlet valve 2, and the valve aperture can be adjusted by controlling by the control unit 400 the actuation current supplied to the solenoid. Each inlet valve 2 as above is installed in the inner inlet-valve installation hole 32A or the outer inlet-valve installation hole 32B, which is arranged in an upper portion of the base body 100 above the pump axis Y1 as illustrated in FIG. 2B. Since two inlet valves 2 are arranged in each of the brake output systems K1 and K2, two inner inlet-valve installation holes 32A and two outer inlet-valve installation holes 32B are arranged in the base body 100. The two inner inlet-valve installation holes 32A and two outer inlet-valve installation holes 32B are arranged approximately along a line in the direction of the pump axis Y1.

Referring back to FIG. 20, the check valves 2a are valves which allow the flow of the brake fluid only from the downstream side to the upstream side. Each check valve 2a is connected in parallel to one of the inlet valves 2.

The outlet valves 3 are realized by normally-closed solenoid valves arranged between the wheel hydraulic pressure line B and the release line E. Each outlet valve 3 shuts off inflow of the brake fluid from the wheel brakes FR and RL (or FL or RR) side to the reservoir 5 side when the outlet valve 3 is closed, and allows the inflow when the outlet valve 3 is open. In the normally-closed solenoid valve realizing each outlet valve 3, an electromagnetic coil for actuating a valve element in the solenoid valve is electrically connected to the control unit 400. The normally-closed solenoid valve is opened when the electromagnetic coil is energized on the basis of a command from the control unit 400, and closed when the electromagnetic coil is demagnetized. Each outlet valve 3 as above is installed in an inner outlet-valve installation hole 33A or the outer outlet-valve installation hole 33B, which is arranged in a lower portion of the base body 100 as illustrated in FIG. 2B. Since two outlet valves 3 are arranged in each of the brake output systems K1 and K2, two inner outlet-valve installation holes 33A and two outer outlet-valve installation holes 33B are arranged in the base body 100. The two inner outlet-valve installation holes 33A and the two outer outlet-valve installation holes 33B are located on the front side of the center of the pump bore 36 (the pump axis Y1), and arranged approximately along a line in the direction of the pump axis Y1 in such a manner that portions of the two inner outlet-valve installation holes 33A and the two outer outlet-valve installation holes 33B overlap the pump axis Y1 in front view.

Referring back to FIG. 20, the suction valve 4 switches between a state in which the suction hydraulic pressure line C is opened and a state in which the suction hydraulic pressure line C is shut off. The suction valves 4 in the present embodiment are normally-closed mechanical valves each of which operates in conjunction with one of the reservoirs 5. Each suction valve 4 is maintained in a closed state during normal operation, in which the brake pedal BP is not pressed by an operator. The suction valve 4 is brought into an open state in conjunction with operation of the reservoir 5 during self-increasing operations in which the wheel cylinder pressure is increased for automatically applying a braking force to the wheels even without a brake manipulation by the operator. The self-boosting operations are performed, for example, for control for assisting in stabilization of the vehicle behavior, traction control, and the like.

Figure 5:
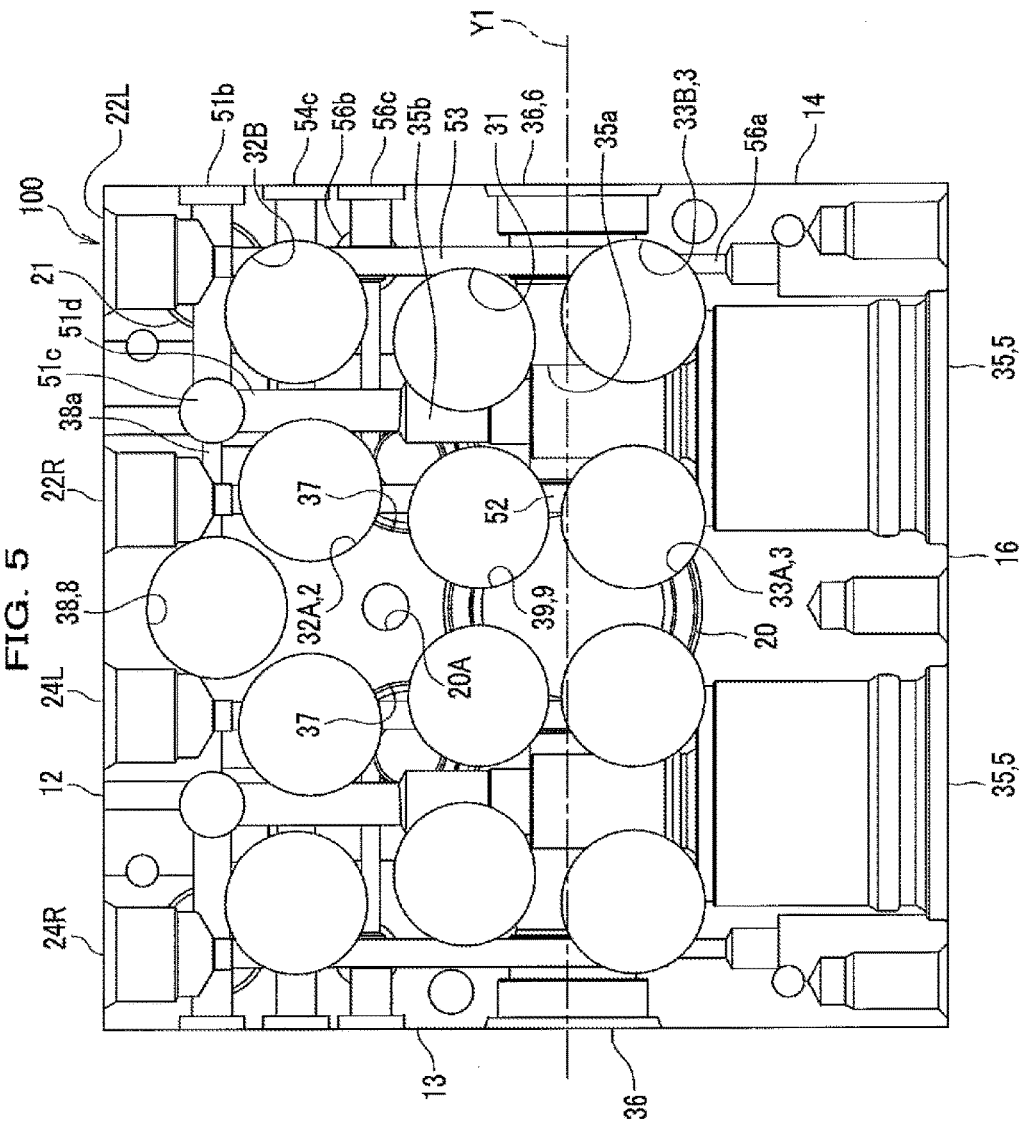
FIG. 5 is a transparent view, from the front side, of the base body of the vehicular brake hydraulic pressure control apparatus according to the embodiment of the present invention.
Figure 12A:
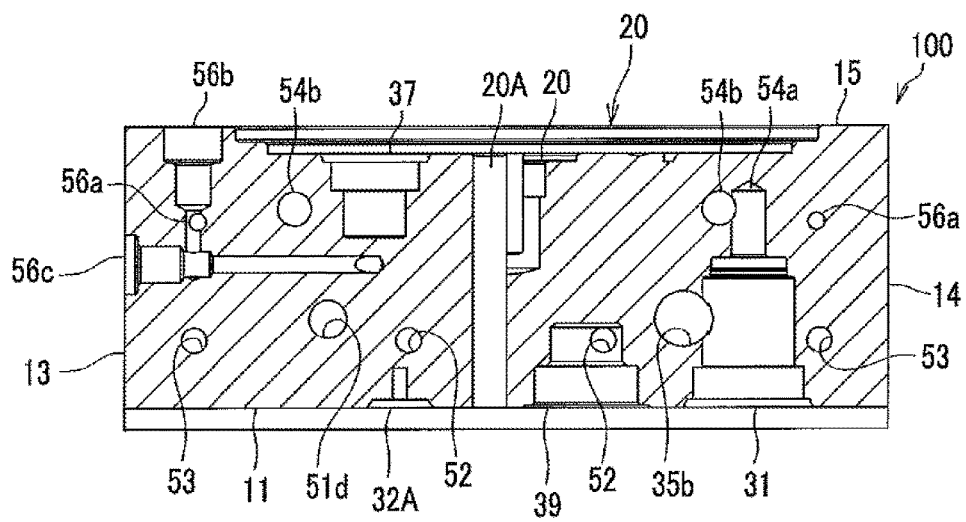
FIG. 12A is a cross-sectional view of the structure of FIG. 2B at the cross section indicated by the line IV-IV in FIG. 2B.
Figure 12B:
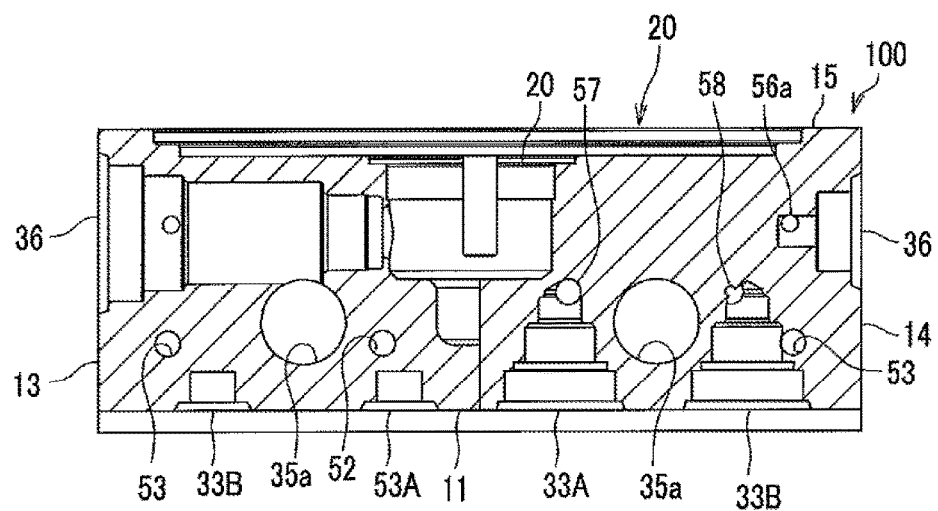
FIG. 12B is a cross-sectional view of the structure of FIG. 2B at the cross section indicated by the line V-V in FIG. 2B.

As illustrated in FIG. 5, the suction valve 4 as above is received in a large-diameter housing portion (large-diameter portion) 35a and a small-diameter housing portion (small-diameter portion) 35b, which are arranged to communicate with the top of a reservoir hole 35. The large-diameter housing portion 35a is arranged between one of the outer outlet-valve installation holes 33B and one of the inner outlet-valve installation holes 33A in the direction of the pump axis Y1 of the base body 100, where the one of the outer outlet-valve installation hole 33B and the one of the inner outlet-valve installation hole 33A are arranged on an edge side of the base body 100 with respect to a reference line X in the vertical direction passing through a rotational axis (i.e., a reference line X passing through the rotational axis of the motor 200 and being indicated in FIG. 3A). A portion of the large-diameter housing portion 35a is directly connected to (communicates with) the pump bore 36 (as illustrated in FIG. 12B). That is, each suction valve 4 is arranged between ones of the outlet valves 3 which are arranged adjacent to each other at an edge of the base body 100. The small-diameter housing portion 35b is arranged between a caliper-pressure-sensor installation hole 39 and the cut-valve installation hole 31 in the direction of the pump axis Y1, and a portion of the small-diameter housing portion 35b is directly connected to (communicates with) the cut-valve installation hole 31 (as illustrated in FIG. 12A).

Figure 3A:
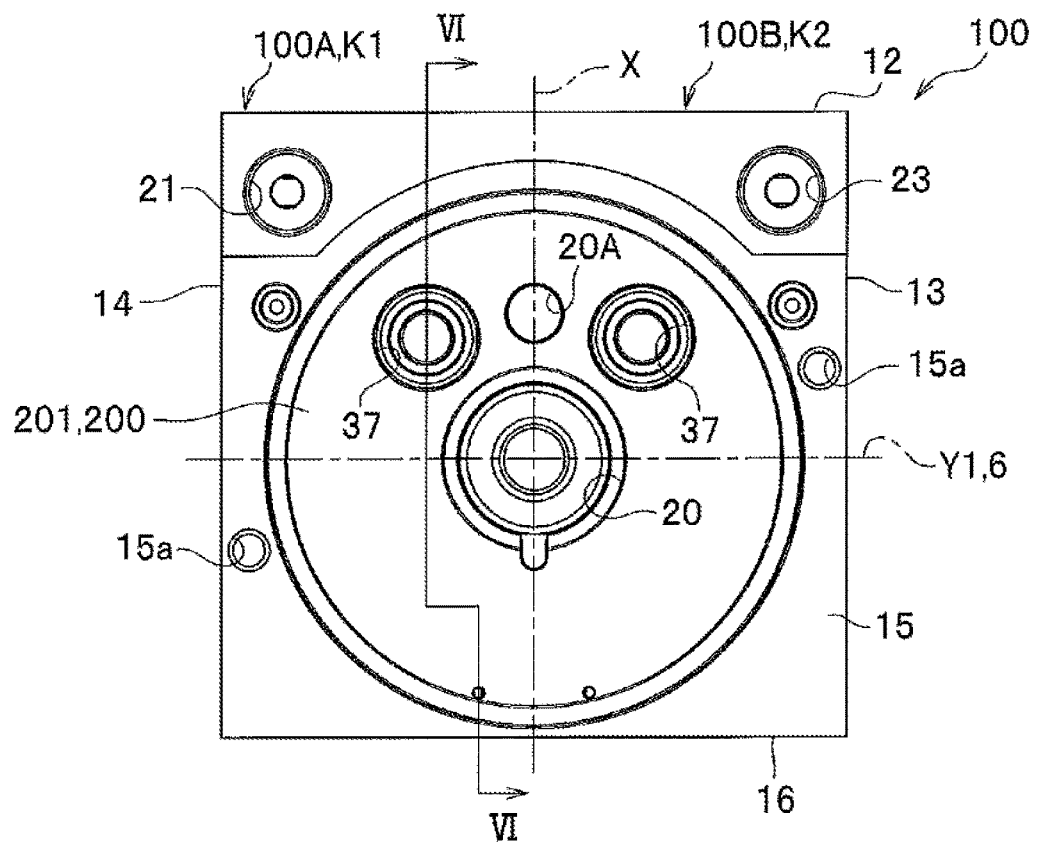
FIGS. 3A and 3B include diagrams illustrating the base body according to the embodiment, where
Figure 3B:
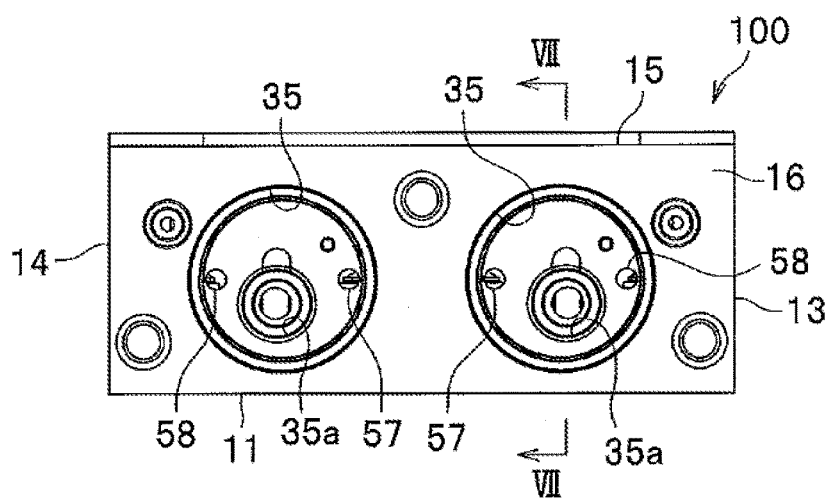

Referring back to FIG. 20, the reservoir 5 is arranged in the release line E, and has a function of temporarily reserving the brake fluid which is released when each outlet valve 3 is opened. In addition, the suction valve 4 is arranged between the reservoir 5 and the pump 6. The reservoir 5 is arranged in a lower portion of the base body 100 as illustrated in FIG. 3B, and formed by using the reservoir hole 35 (illustrated in FIG. 3B), which is open at the bottom surface 16 of the base body 100 below the pump bore 36.

Figure 2C:
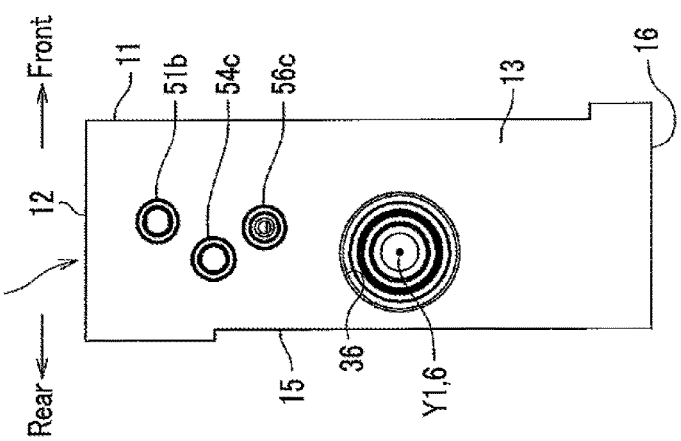

As illustrated in FIG. 20, the pump 6 is arranged between the suction hydraulic pressure line C (communicating with the output hydraulic pressure line A) and the discharge hydraulic pressure line D (communicating with the wheel hydraulic pressure line B). The pump 6 is driven by the torque of the motor 200 to take in the brake fluid which is temporarily reserved in the reservoir 5, and discharge the brake fluid to the discharge hydraulic pressure line D. In addition, when the cut valve 1 is closed and the suction valve 4 is open, the pump 6 takes in the brake fluid which is reserved in the master cylinder M, the output hydraulic pressure line A, the suction hydraulic pressure line C, and the reservoir 5, and discharges the brake fluid to the discharge hydraulic pressure line D. Therefore, the brake fluid generated by a manipulation of the brake pedal BP can be increased. Further, even when the brake pedal BP is not manipulated, the brake fluid can be applied to the wheel brakes FR and RL (or FL and RR), i.e., the vehicle behavior control for assisting in stabilization of the vehicle behavior and the like are enabled. The pump 6 as above is installed in the pump bore 36 (around the pump axis Y1) as illustrated in FIG. 2C, where the pump bore 36 is formed by drilling from the left side 13 or the right side 14 of the base body 100.

Figure 14:
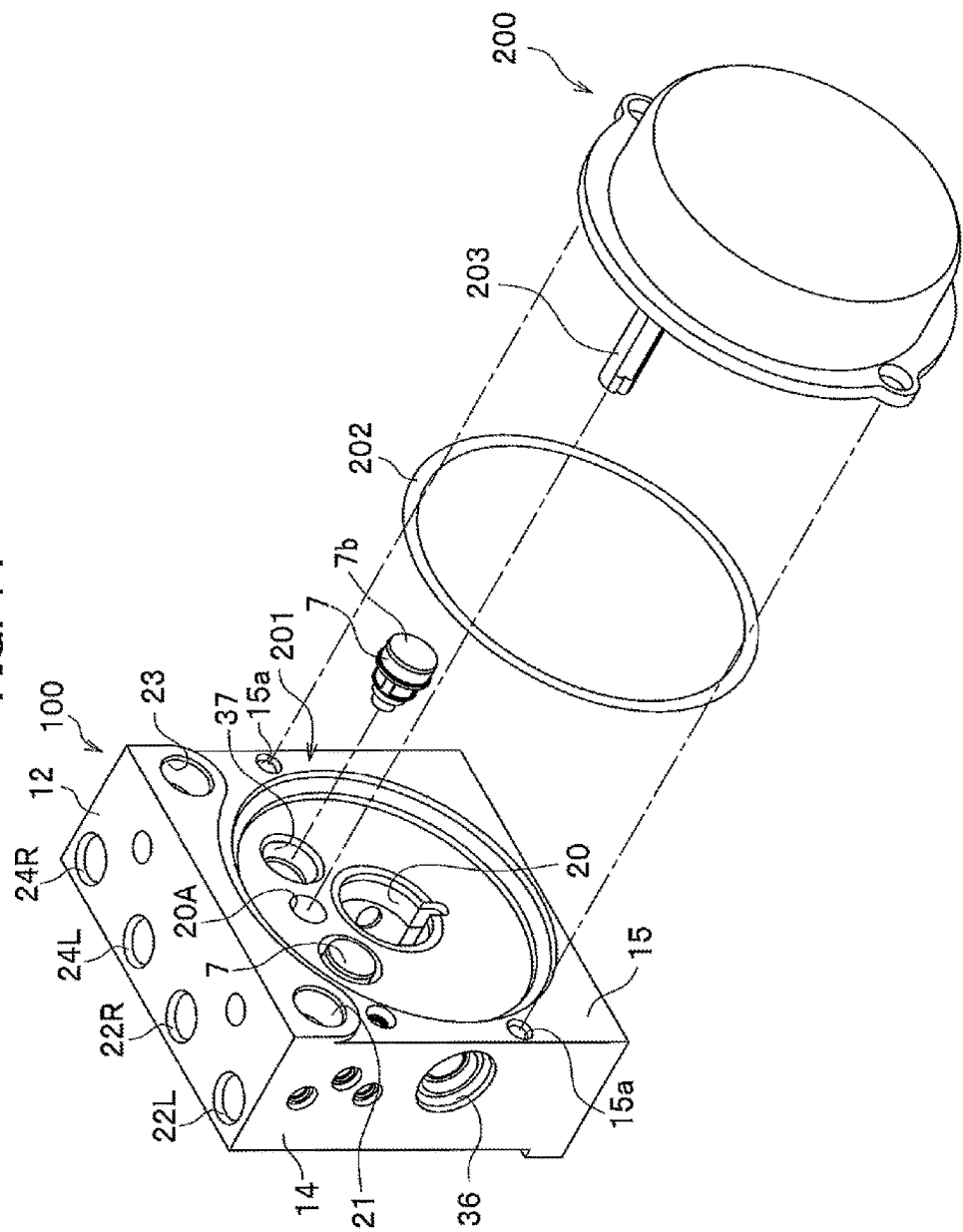
FIG. 14 is a rear perspective view of the base body presented for illustrating an arrangement of a damper.

As illustrated in FIG. 20, the damper 7 and the orifice 6a are arranged in series in the middle of the discharge hydraulic pressure line D, and have a function of damping the pulsation of the brake fluid discharged from the pump 6, by cooperation of the damper 7 and the orifice 6a. The discharge hydraulic pressure line D is configured such that the brake fluid flows in the following manner. That is, the brake fluid directly flows from the pump 6 into the damper 7 through an inlet fluid line Da (in the discharge hydraulic pressure line D), which is connected to the discharge port of the pump 6. In addition, the brake fluid which flows into the damper 7 and the pulsation of which is damped flows out to an outlet fluid line Db, which is arranged separately from the inlet fluid line Da (in the discharge hydraulic pressure line D). Then, the brake fluid flows downstream through the orifice 6a, which is arranged in the outlet fluid line Db. The damper 7 as above is arranged in a damper hole 37, which is arranged on the rear side (another side) 15 of the base body 100 as illustrated in FIG. 3A. The damper hole 37 is a bottomed hole formed by drilling the base body 100 from a mounting face 201 for the motor 200 (which is the area covered by the front face of the motor 200). The motor 200 is sealed to the mounting face 201 with a sealing member 202 (as illustrated in FIG. 14), and the damper 7 is arranged in the area of the mounting face 201 which is sealed with the sealing member 202.

Referring back to FIG. 20, the master-pressure sensor 8 measures the brake hydraulic pressure in the output hydraulic pressure line A, i.e., the magnitude of the brake hydraulic pressure in the master cylinder M. The master-pressure sensor 8 is arranged in the brake output system K1. Since the master cylinder M is a tandem type as mentioned before, and therefore the magnitudes of the brake hydraulic pressures in the brake output systems K1 and K2 are similar, the master-pressure sensor 8 is arranged in only the brake output system K1. The value of the brake hydraulic pressure measured by the master-pressure sensor 8 is taken into the control unit 400 when necessary, and the control unit 400 determines whether or not the brake hydraulic pressure is outputted from the master cylinder M, i.e., whether or not the brake pedal BP is pressed. Further, the control unit 400 performs vehicle behavior control and the like on the basis of the magnitude of the brake hydraulic pressure measured by the master-pressure sensor 8. The master-pressure sensor 8 as above is installed in a hydraulic pressure source-side sensor installation hole 38, which is arranged in an upper portion of the base body 100 as illustrated in FIG. 2B. The hydraulic pressure source-side sensor installation hole 38 is arranged above the inner inlet-valve installation holes 32A on the reference line X (i.e., on the line as the boundary between flow-path forming portions 100A and 100B). In addition, an installation hole 20A as a through-hole is arranged below the hydraulic pressure source-side sensor installation hole 38.

Referring back to FIG. 20, the caliper-pressure sensor 9 measures the magnitude of the brake hydraulic pressure which is applied to the wheel brake FR (or RL) of a front wheel as a driving wheel. The value of the brake hydraulic pressure measured by the caliper-pressure sensor 9 is taken into the control unit 400 when necessary, and antilock braking control, vehicle behavior control, and the like are performed on the basis of the measured magnitude of the brake hydraulic pressure.

The caliper-pressure sensor 9 is installed in the caliper-pressure-sensor installation hole 39 in the base body 100 as illustrated in FIG. 2B. The two caliper-pressure-sensor installation holes 39 are arranged between the inner inlet-valve installation hole 32A and the inner outlet-valve installation hole 33A. Further, the two caliper-pressure-sensor installation holes 39 are arranged between the cut-valve installation holes 31 in the direction of the pump axis Y1, and the two caliper-pressure-sensor installation holes 39 and the cut-valve installation holes 31 are arranged approximately along a line.

Referring back to FIG. 20, the motor 200 is a power source common to the pumps 6 in the brake output systems K1 and K2, and operates on the basis of a command from the control unit 400. The motor 200 is formed to be able to be mounted on the mounting face 201, which is arranged on the rear side (another side) 15 as illustrated in FIG. 3A. In the state in which the motor 200 is mounted, the motor 200 covers the damper holes 37 formed on the mounting face 201.

The control unit 400 (illustrated in FIG. 1) controls opening and closing of the cut valve 1 in the regulator R and the inlet valves 2 and the outlet valves 3 in the control-valve unit V, and the operation of the motor 200 on the basis of the outputs of the master-pressure sensor 8, the caliper-pressure sensor 9, and a wheel speed sensor, which detects the wheel speed and is not shown.

Next, the control of normal braking, antilock braking, and vehicle behavior, which is performed by the control unit 400, is explained with reference to FIG. 20 illustrating the hydraulic circuit. In the embodiment explained below, a front-wheel drive vehicle, in which the front wheels are driving wheels, is taken as an example.

<Normal Braking> During normal braking, in which each wheel is not possibly locked, every electromagnetic coil which activates one of the aforementioned solenoid valves can be demagnetized by the control unit 400. That is, during normal braking, the cut valve 1 and the inlet valves 2 are open, the outlet valves 3 are closed, the suction valve 4 is kept closed, and the master cylinder M and the reservoir 5 are shut off.

When the operator presses the brake pedal BP under the above condition, the brake hydraulic pressure caused by the pedal force is transmitted to the wheel brakes FR, RL, FL, and RR without change, so that the respective wheels are braked.

Since the brake hydraulic pressure in the wheel hydraulic pressure line B connected to the front right and front left wheel brakes FR and FL is actually measured by the caliper-pressure sensor 9 during the normal braking, it is possible to confirm that a desired brake hydraulic pressure is applied to the wheel brakes FR and FL.

<Antilock Braking Control> The antilock braking control is performed when one or more of the wheels are nearly locking up. The antilock braking control is realized by controlling the control-valve unit V for each of the one or more of the wheel brakes FR, RL, FL, and RR which are nearly locking up, so as to appropriately select the mode of application of the brake hydraulic pressure to each of the wheel brakes FR, RL, FL, and RR from among pressure reduction, pressure increase, and pressure keeping. The selection is made by the control unit 400 on the basis of the wheel speed, which is obtained from the wheel speed sensor (not shown).

When one or more of the wheels are nearly locking up while the brake pedal BP is being pressed, the antilock braking control is started by the control unit 400.

Hereinbelow, the operations during the antilock braking control are explained on the assumption that the front right wheel (which can be braked by the wheel brake FR) is nearly locking up.

When the control unit 400 determines that the brake hydraulic pressure applied to the wheel brake FR should be reduced, the wheel hydraulic pressure line B is shut off by the control-valve unit V corresponding to the wheel brake FR, and the release line E is opened. Specifically, the control unit 400 closes the inlet valve 2 by energization, and opens the outlet valve 3 by energization. Thus, the brake fluid in the wheel hydraulic pressure line B, which communicates with the wheel brake FR, passes through the release line E and flows into the reservoir 5, so that the brake hydraulic pressure applied to the wheel brake FR is reduced. At this time, the brake hydraulic pressure in the wheel hydraulic pressure line B is measured by the caliper-pressure sensor 9, and the measured values are taken into the control unit 400 as needed.

In order to perform the antilock braking control, the control unit 400 drives the motor 200 to operate the pump 6 so that the brake fluid reserved in the reservoir 5 is discharged to the discharge hydraulic pressure line D, and returns from the discharge hydraulic pressure line D to the wheel hydraulic pressure line B.

When the control unit 400 determines that the brake hydraulic pressure applied to the wheel brake FR should be kept constant, the control-valve unit V corresponding to the wheel brake FR shuts off the wheel hydraulic pressure line B and the release line E. Specifically, the control unit 400 closes the inlet valve 2 by energization, and closes the outlet valve 3 by demagnetization. The above operations enclose the brake fluid in the fluid line closed by the inlet valve 2 and the outlet valve 3, so that the brake hydraulic pressure applied to the wheel brake FR is kept constant.

Further, when the control unit 400 determines that the brake hydraulic pressure applied to the wheel brake FR should be increased, the control-valve unit V corresponding to the wheel brake FR opens the wheel hydraulic pressure line B and closes the release line E. Specifically, the control unit 400 opens the inlet valve 2 by demagnetization, and closes the outlet valve 3 by demagnetization. Because of the above operations, the brake hydraulic pressure caused by the pedal force on the brake pedal BP is directly applied to the wheel brake FR, so that the brake hydraulic pressure applied to the wheel brake FR is increased.

When the above antilock braking control is performed, the brake hydraulic pressure in the wheel hydraulic pressure line B which is connected to the front right wheel brake FR is measured by the caliper-pressure sensor 9. Therefore, the control unit 400 can perform fine hydraulic pressure control according to the measured brake hydraulic pressure. Specifically, the control unit 400 opens and closes the outlet valve 3 so as not excessively reduce the brake hydraulic pressure in the wheel hydraulic pressure line B, by sensing the brake hydraulic pressure in the wheel hydraulic pressure line B. It is possible to set the aperture and the valve opening duration of the outlet valve 3 such that the brake hydraulic pressure in the wheel hydraulic pressure line B is not excessively reduced. Because of the above operations, the brake hydraulic pressure can be controlled with high precision on the basis of the magnitude of the brake hydraulic pressure measured by the caliper-pressure sensor 9, and the brake hydraulic pressure can be immediately returned to a desired pressure when it is determined that the wheel gets out of the situation in which the wheel is nearly locking up and that the brake hydraulic pressure applied to the wheel brake FR should be increased. Further, when it is determined that the brake hydraulic pressure applied to the wheel brake FR should be kept constant, a brake hydraulic pressure which is most appropriate for the wheel brake FR can be easily maintained with high reliability by controlling opening and closing the inlet valve 2 and the outlet valve 3 while actually measuring the brake hydraulic pressure applied to the wheel brake FR.

<Vehicle Behavior Control> The vehicle behavior control is performed for preventing disturbance in the vehicle behavior caused by variations in the traveling condition which can occur during traveling, in particular, traveling in rainy weather, cornering on a snowy road, and the like.

The vehicle behavior control such as the side slip control or the traction control is started by the control unit 400 according to the condition of the vehicle. In the case considered in the following explanations, the behavior of the vehicle is stabilized by braking the front right wheel (i.e., the wheel which can be braked by the wheel brake FR) while the brake pedal BP (illustrated in FIG. 20) is not manipulated.

When the control unit 400 determines that the front right wheel should be braked while the brake pedal BP is not manipulated, the control unit 400 closes the cut valve 1 by energization, causes the control-valve unit V corresponding to the wheels other than the front right wheel required to be braked to close the corresponding inlet valves 2, and operates the motor 200 to drive the pump 6 under the above valve condition. Because of the above operations, a pump suction chamber 4a (illustrated in FIG. 1) arranged in the suction valve 4 is brought into a negative pressure condition, and a piston in the reservoir 5 is displaced by the negative pressure condition to open the suction valve 4. Thus, the brake fluid reserved in the master cylinder M, the output hydraulic pressure line A, and the suction hydraulic pressure line C flows through the pump 6 and the discharge hydraulic pressure line D into only the wheel hydraulic pressure line B connected to the wheel brake FR, so that the brake hydraulic pressure is applied to the wheel brake FR to brake the front right wheel.

When the above vehicle behavior control is performed, pulsation of the brake fluid discharged from the pump 6 can be preferably damped by cooperation of the damper 7 and the orifice 6a, which are arranged in series in the middle of the discharge hydraulic pressure line D extending from the pump 6.

In addition, when the difference in the brake hydraulic pressure between the output hydraulic pressure line A and the wheel hydraulic pressure line B becomes a preset value or greater, the cut valve 1 operates as a relief valve, and the brake fluid in the wheel hydraulic pressure line B is released to the output hydraulic pressure line A.

In addition, since the brake hydraulic pressure in the wheel hydraulic pressure line B which is connected to the front right wheel brake FR is actually measured by the caliper-pressure sensor 9, the control unit 400 can finely control the hydraulic pressure in the wheel hydraulic pressure line B to become a desired value. Thus, the control unit 400 can control the brake hydraulic pressure with high accuracy.

Next, a concrete structure of the brake hydraulic pressure control apparatus U is explained in detail with reference to FIGS. 1 to 8.

As mentioned before, the brake hydraulic pressure control apparatus U is constituted by the base body 100, the motor 200, the control housing 300, and the control unit 400.

The base body 100 is formed of an extruded or cast piece of aluminum alloy to have the shape of approximately a rectangular parallelepiped. The front side (one side) 11 of the base body 100 except a protrusion at the bottom edge is shaped into a substantially flat face with no irregularity. As illustrated in FIG. 2B, two flow-path structure portions 100A and 100B, which correspond to the two brake output systems K1 and K2 (as illustrated in FIG. 20), are formed in the base body 100. Specifically, the flow-path structure portion 100A, which corresponds to the brake output system K1, is formed in the right half of the base body 100 viewed from the front side 11 (i.e., the region on the right side of the reference line X in the illustration), and the flow-path structure portion 100B, which corresponds to the brake output system K2, is formed in the left half of the base body 100 (i.e., the region on the left side of the reference line X in the illustration). In the present embodiment, the flow-path structure portions 100A and 100B are formed substantially laterally symmetric, and the internal structures of the flow-path structure portions 100A and 100B are approximately identical. Therefore, the following explanations are mainly focused on the flow-path structure portion 100A.

Referring to FIGS. 2A to 2C and FIGS. 3A to 3B, the flow-path structure portion 100A includes the inlet port 21 (or an inlet port 23 in the flow-path structure portion 100B), a motor-installation hole 20, the damper hole 37, the two outlet ports 22R and 22L (or the outlet ports 24R and 24L in the flow-path structure portion 100B), the pump bore 36, and a plurality of installation holes opening on the front side 11. The inlet port 21 is open on the rear side 15 (which is the side opposite to the aforementioned one side). The two outlet ports 22R and 22L are open on the top side 12. The pump bore 36 is open on the right side 14.

The mounting face 201 is formed on the rear side 15. The mounting face 201 is recessed from the rear side 15 and has a round shape centered around the axial center. The front cover of the housing of the motor 200 (illustrated in FIG. 1) faces the mounting face 201. The motor 200 is attached to the mounting face 201 via the sealing member 202 (illustrated in FIG. 14). Specifically, the motor 200 is mounted with the mounting screws (not shown) to mounting holes 15a, which are arranged on the rear side 15 (as illustrated in FIG. 3A). The installation hole 20A, which penetrates through the base body 100 in the front-rear direction, is arranged above the motor-installation hole 20 on the mounting face 201. A power-supply terminal 203 (illustrated in FIG. 14) of the motor 200 is to be attached to the installation hole 20A.

In addition, the damper holes 37 are open on the mounting face 201. The damper holes 37 are arranged on the lateral sides of the installation hole 20A above the pump axis Y1 in such a manner that the installation hole 20A is sandwiched between the damper holes 37. That is, the damper holes 37 are arranged in the dead space around the installation hole 20A. The entire opening of each damper hole 37 is covered by the motor 200 and sealed with the sealing member 202. The damper holes 37 are respectively formed on a straight line passing through the center of the motor-installation hole 20 and the center of the inlet port 21 and a straight line passing through the center of the motor-installation hole 20 and the center of the inlet port 23 (as illustrated in FIG. 3A). Each damper hole 37 is doubly sealed by a lid member 7b (illustrated in FIG. 14) and the sealing member 202, where the lid member 7b is fitted to each damper hole 37, and the sealing member 202 is arranged between the motor 200 and the mounting face 201.

The flow-path structure portion 100A includes, as the installation holes opening on the front side 11, the inner inlet-valve installation hole 32A, the outer inlet-valve installation hole 32B, the cut-valve installation hole 31, the caliper-pressure-sensor installation hole 39, the inner outlet-valve installation hole 33A, and the outer outlet-valve installation hole 33B, where the inner inlet-valve installation hole 32A and the outer inlet-valve installation hole 32B are arranged on the upper side of the pump axis Y1 in the base body 100, the cut-valve installation hole 31 is arranged between the pump axis Y1 and the outer inlet-valve installation hole 32B, the caliper-pressure-sensor installation hole 39 is arranged between the pump axis Y1 and the inner inlet-valve installation hole 32A, and the inner outlet-valve installation hole 33A and the outer outlet-valve installation hole 33B are arranged on the lower side of the cut-valve installation hole 31 in the base body 100. In addition, the hydraulic pressure source-side sensor installation hole 38 is formed at the boundary between the flow-path structure portion 100A and the flow-path structure portion 100B. The hydraulic pressure source-side sensor installation hole 38 is formed above the installation hole 20A.

The cut valve 1 (illustrated in FIG. 20) constituting the regulator R is installed in the cut-valve installation hole 31, the inlet valves 2 (illustrated in FIG. 20) are respectively installed in the inner inlet-valve installation hole 32A and the outer inlet-valve installation hole 32B, and the outlet valves 3 (illustrated in FIG. 20) are respectively installed in the inner outlet-valve installation hole 33A and the outer outlet-valve installation hole 33B. In addition, the caliper-pressure sensor 9 (illustrated in FIG. 20) is installed in the caliper-pressure-sensor installation hole 39, and the master-pressure sensor 8 (illustrated in FIG. 20) is installed in the hydraulic pressure source-side sensor installation hole 38. Further, the power-supply terminal 203 (illustrated in FIG. 14) of the motor 200 mounted on the rear side 15 is inserted through the installation hole 20A, and the reservoir 5 (illustrated in FIG. 20) is installed in the reservoir hole 35 on the bottom side 16 as illustrated in FIG. 3B.

As illustrated in FIG. 2B, the cut-valve installation hole 31, the inner inlet-valve installation hole 32A, the outer inlet-valve installation hole 32B, the inner outlet-valve installation hole 33A, and the outer outlet-valve installation hole 33B are open on the same face on the front side 11 of the flow-path structure portion 100A. In the present embodiment, the above installation holes have an identical diameter.

In the present embodiment, the piping arrangement H2 (illustrated in FIG. 20) extending to the wheel brake FR is connected to the outlet port 22R on the upper side 12 of the flow-path structure portion 100A, where the outlet port 22R is located relatively near to the reference line X (on the inner side of the base body 100 as illustrated in FIG. 2A) on the top side 12. In addition, the piping arrangement H2 (illustrated in FIG. 20) extending to the wheel brake RL is connected to the outlet port 22L on the upper side 12 of the flow-path structure portion 100A, where the outlet port 22L is located relatively near to the right side 14 (on the outer side of the base body 100 as illustrated in FIG. 2A) on the top side 12.

Next, concrete structures of the reservoir 5 and the suction valve 4 are explained with reference to FIG. 4. In the base body 100, a reservoir housing portion 5*a* having a relatively large diameter, the large-diameter housing portion 35*a* having a diameter smaller than the reservoir housing portion 5*a*, and the small-diameter housing portion 35*b* having a diameter smaller than the large-diameter housing portion 35*a* are continuously arranged. The reservoir housing portion 5*a* has the shape of a bottomed cylinder. In the reservoir housing portion 5*a*, a reservoir piston 5*b* is biased by a reservoir spring 5*c* to the direction for reducing the volume in the reservoir housing portion 5*a*. An intermediate valve 301 is arranged in the large-diameter housing portion 35*a*, and includes an intermediate piston 303 which can open an upper valve 302. The upper valve 302 is arranged in the small-diameter housing portion 35*b*, and is located above the intermediate valve 301. The upper valve 302 is a normally-closed valve which allows communication between the reservoir 5 side and the master cylinder M side when the upper valve 302 is opened.

In the reservoir housing portion 5*a*, an atmospheric-pressure chamber 5*e*, which communicates with the atmosphere through an aspiration path (not shown), is arranged in the reservoir housing portion 5*a*. A reservoir chamber 5*d* (the reservoir hole 35) is formed between the reservoir piston 5*b* and the intermediate piston 303. The reservoir chamber 5*d* communicates with the outlet valves 3 through the release line E (illustrated in FIG. 20). A pump suction chamber 304 is formed between the intermediate piston 303 and the upper valve 302. The pump suction chamber 304 communicates with the suction side of the pump 6 through the suction hydraulic pressure line C (illustrated in FIG. 20). In the present embodiment, the pump suction chamber 304 is directly connected to the pump 6.

A communication path 305, which realizes communication between the pump suction chamber 304 on the upper side and the reservoir chamber 5*d* on the lower side, is arranged in approximately the center of the intermediate valve 301. An open-close valve 306, which functions as an open-close means for opening and closing the communication path 305, is arranged in the communication path 305. An intermediate-piston spring 307, which biases the intermediate piston 303 toward the upper valve 302, is arranged between the intermediate piston 303 and the upper valve 302. A sealing member 308 is fitted onto the outer circumference of the intermediate piston 303 via an annular groove.

The open-close valve 306 includes a valve sheet 309, a valve element 310, and a valve spring 311. The valve sheet 309 is realized by a tapered face formed in a stepped through-hole arranged in the intermediate piston 303. The valve element 310 is realized by a ball (steel ball) which can be seated on the valve sheet 309. The valve spring 311 biases the valve element 310 toward the valve sheet 309.

A pressing member 312, which protrudes upward, is arranged in the intermediate valve 301. The upper valve 302 is opened by pressing a ball 313 so as to separate the ball 313 from a seat portion 314, where the ball 313 is located above the pressing member 312. When the reservoir piston 5*b* and the intermediate piston 303 are lifted, the pressing member 312 is also lifted to come into contact with the ball 313 in the upper valve 302. A negative-pressure release pin 317 is arranged in the intermediate piston 303. When the reservoir piston 5*b* is displaced by a predetermined amount from the initial position toward the direction for decreasing the volume of the reservoir piston 5*b*, the negative-pressure release pin 317 presses the valve element 310 upward to separate the valve element 310 from the valve sheet 309, so that the open-close valve 306 is opened.

Since the negative-pressure release pin 317 is provided, the reservoir chamber 5*d* can be released from a continuing negative-pressure state to bring the reservoir piston 5*b* and the intermediate piston 303 to their initial positions, so that space in the reservoir chamber 5*d* can be secured when the ABS control is started.

Further, a plate spring (not shown), which amplifies a propelling force for displacing the reservoir piston 5*b* toward the intermediate piston 303, is arranged between the reservoir piston 5*b* and the intermediate piston 303.

The upper valve 302 includes the ball 313 and a spring 315, where the ball 313 is seated on the seat portion 314, and the spring 315 biases the ball 313 toward the seat portion 314. The top of the upper valve 302 communicates with a second fluid line 52 (illustrated in FIG. 5) connected to the master cylinder M. Since the small-diameter housing portion 35*b* is connected (communicates) with the master cylinder M through the second fluid line 52 (illustrated in FIG. 5), when the ball 313 comes apart from the seat portion 314 against the spring force of the spring 315 and therefore the upper valve 302 is opened, the brake hydraulic pressure from the master cylinder M (the master cylinder pressure) flows into the pump suction chamber 304, or the brake hydraulic pressure in the pump suction chamber 304 flows into the master cylinder M side.

Figure 6:
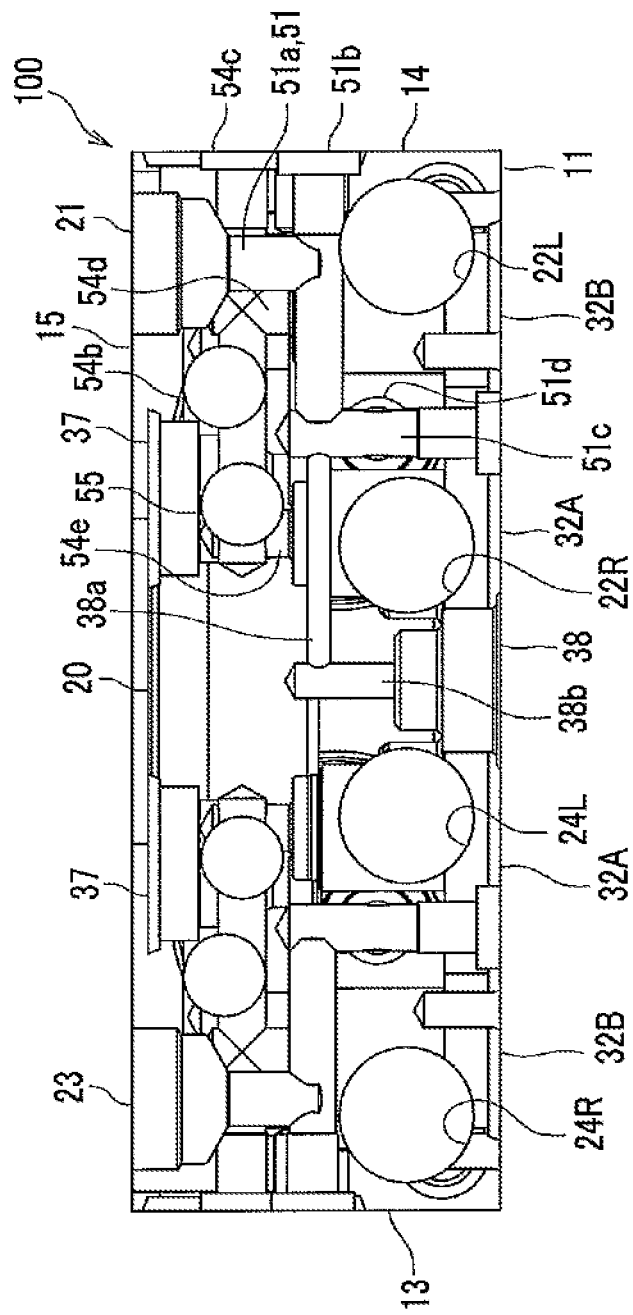
FIG. 6 is a transparent view, from the top side, of the base body of the vehicular brake hydraulic pressure control apparatus according to the embodiment of the present invention.
Figure 7:
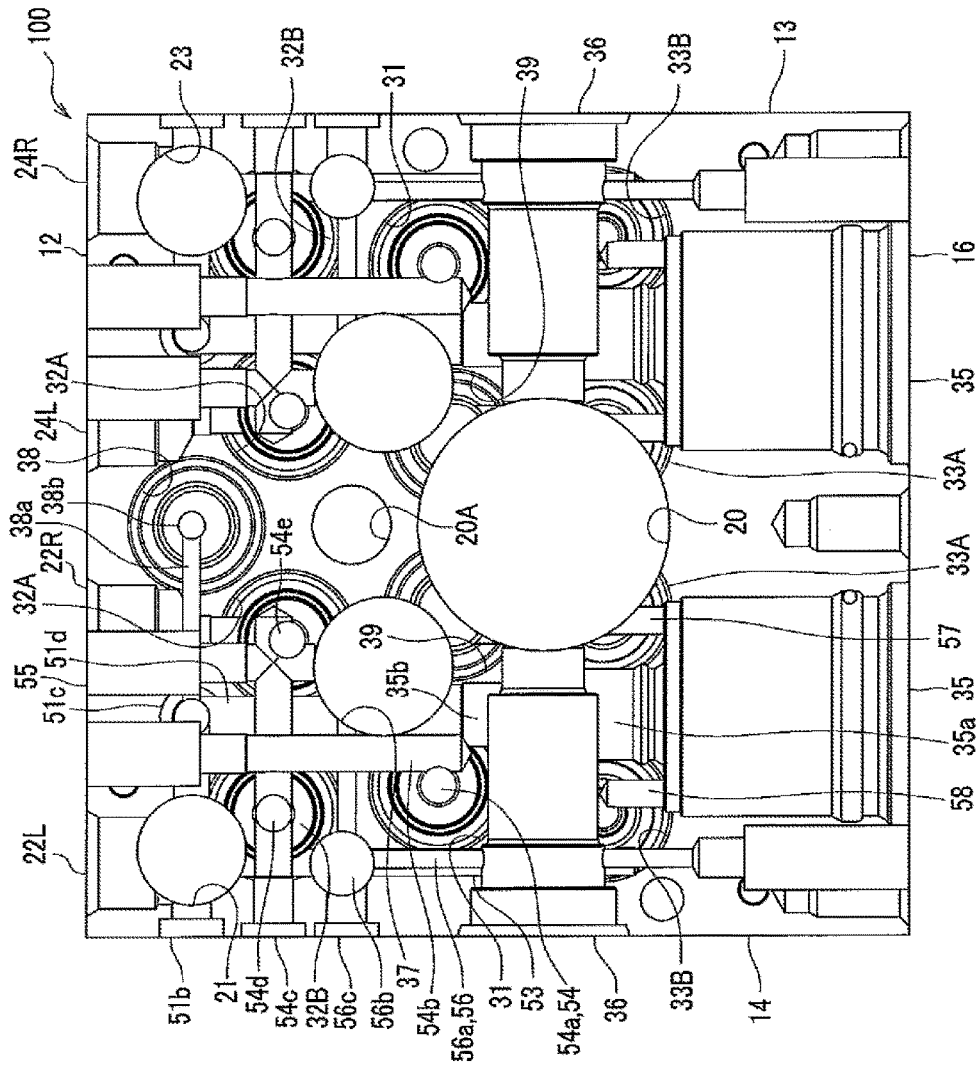
FIG. 7 is a transparent view, from the rear side, of the base body of the vehicular brake hydraulic pressure control apparatus according to the embodiment of the present invention.
Figure 9:
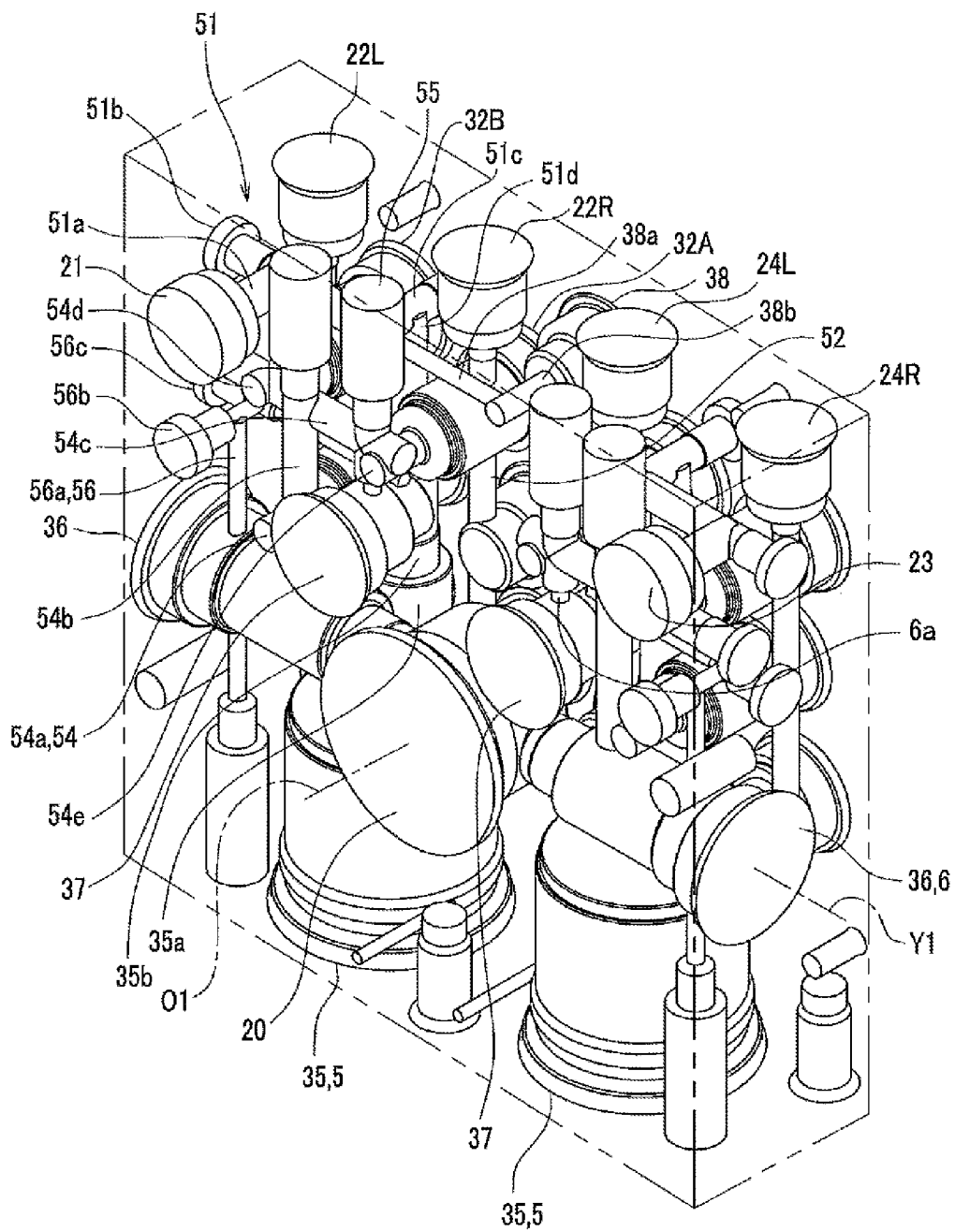
FIG. 9 is a transparent view, from the upper rear side, of the base body of the vehicular brake hydraulic pressure control apparatus according to the embodiment of the present invention.
Figure 11A:
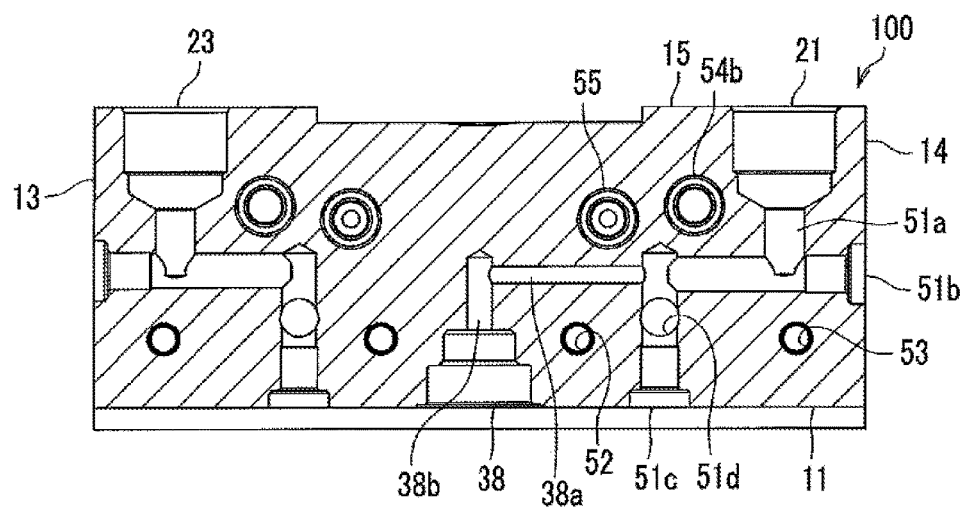
FIG. 11A is a cross-sectional view of the structure of FIG. 2B at the cross section indicated by the line II-II in FIG. 2B.

Next, the fluid lines in the flow-path structure portion 100A are explained in detail. In the following explanations, the respective diagrams in FIGS. 2 and 3 are referred to for the front side 11, the rear side 15, the top side 12, the bottom side 16, the left side 13, and the right side 14 of the flow-path structure portion 100A (of the base body 100). In addition, the term "inner" means the positions of the base body 100 relatively near to the reference line X (i.e., the center side of the base body 100) in the lateral direction, and the term "outer" means the positions of the base body 100 relatively far from the reference line X (i.e., the edge sides of the base body 100) in the lateral direction. As illustrated in FIGS. 6, 7, and 9, the inlet port 21 is a bottomed cylindrical hole, and communicates with a first fluid line 51 (including a transversal hole 51*a*) illustrated in FIG. 6, and with the cut-valve installation hole 31 through the small-diameter housing portion 35*b* illustrated in FIG. 5. As illustrated in FIG. 6 and FIG. 11A, the first fluid line 51 is constituted by the transversal hole 51*a*, a transversal hole 51*b*, a transversal hole 51*c*, and a vertical hole 51*d* (illustrated in FIG. 5). The transversal hole 51*a* is arranged by drilling the flow-path structure portion 100A from the bottom surface of the inlet port 21 toward the front side 11. The transversal hole 51*b* is arranged by drilling the flow-path structure portion 100A from the right side 14 toward the left side 13. The transversal hole 51*c* is arranged by drilling the flow-path structure portion 100A from the front side 11 toward an end of the transversal hole 51*b*. The vertical hole 51*d* is arranged by drilling the flow-path structure portion 100A from the bottom surface of the small-diameter housing portion 35*b* (illustrated in FIG. 5) toward the top side 12.

The front end of the transversal hole 51*a* crosses the transversal hole 51*b*, and the left end of the transversal hole 51*b* crosses the rear end of the transversal hole 51*c*. As illustrated in FIG. 5, the top end of the vertical hole 51d crosses the middle of the transversal hole 51c. The small-diameter housing portion 35b penetrates through the side wall of the cut-valve installation hole 31 in the vertical direction.

In addition, as illustrated in FIG. 6, the rear end of the transversal hole 51c crosses a transversal hole 38a, which is arranged by drilling the flow-path structure portion 100A from the rear end of the transversal hole 51c toward the left side 13. The left end of the transversal hole 38a communicates with a transversal hole 38b, which is a hole arranged by drilling the flow-path structure portion 100A from the bottom surface of the hydraulic pressure source-side sensor installation hole 38 toward the rear side 15. The fluid line from the bottom of the inlet port 21 through the transversal holes 51a to 51c, the vertical hole 51d, and the small-diameter housing portion 35b to a side portion of the cut-valve installation hole 31 corresponds to the output hydraulic pressure line A illustrated in FIG. 20.

Figure 8:
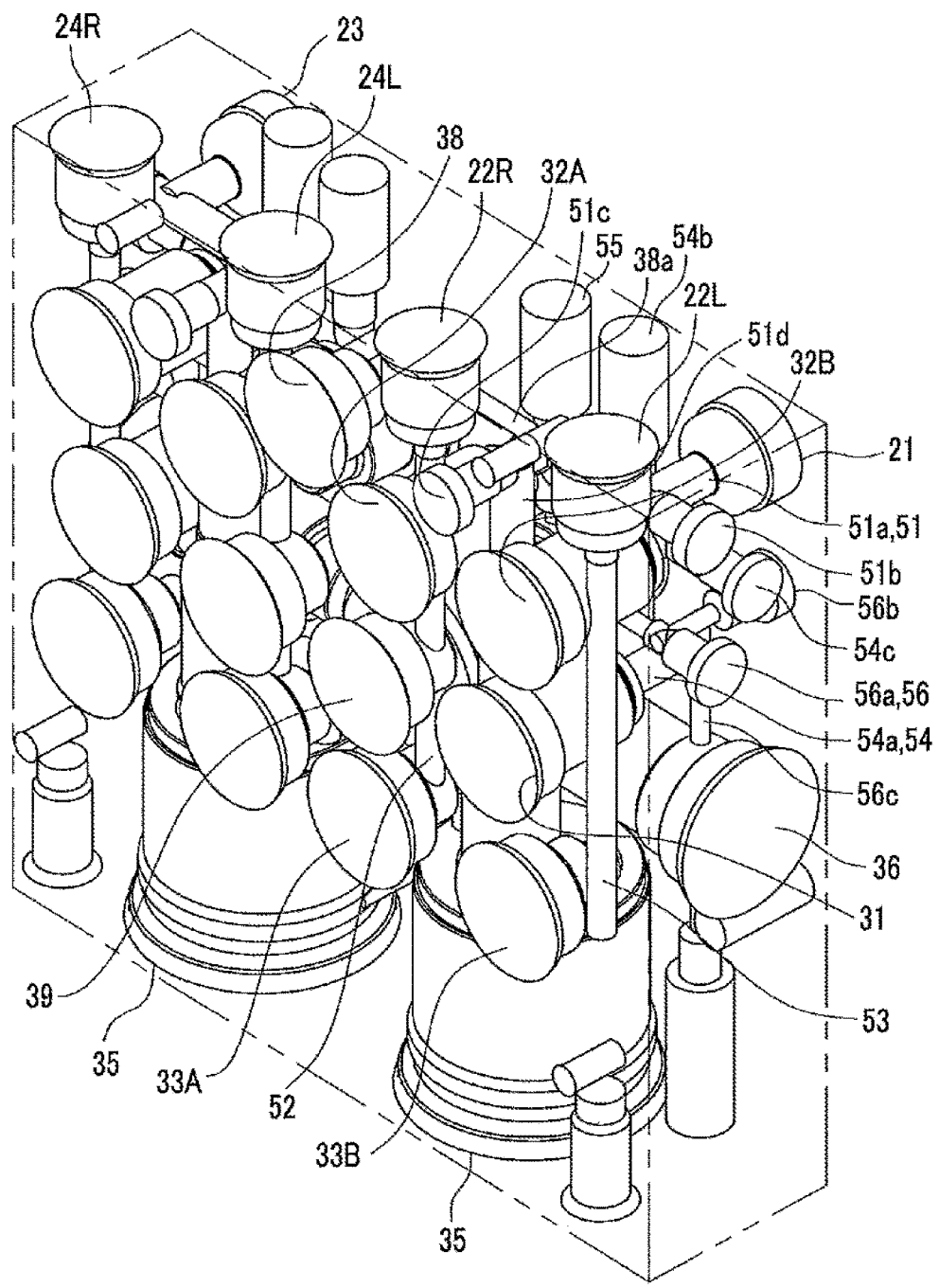
FIG. 8 is a transparent view, from the upper front side, of the base body of the vehicular brake hydraulic pressure control apparatus according to the embodiment of the present invention.

As illustrated in FIGS. 5 and 8, the outlet port 22R, which is located on the inner side, is a bottomed cylindrical hole, and communicates with the inner inlet-valve installation hole 32A through the second fluid line 52. The second fluid line 52 is realized by a vertical hole arranged by drilling the flow-path structure portion 100A from the bottom surface of the outlet port 22R toward the bottom side 16, and penetrates through the side wall of the inner inlet-valve installation hole 32A and the side wall of the caliper-pressure-sensor installation hole 39 in the vertical direction to reach the inner outlet-valve installation hole 33A.

The outlet port 22L, which is located on the outer side, is a bottomed cylindrical hole, and communicates with the outer inlet-valve installation hole 32B through a third fluid line 53. The third fluid line 53 is realized by a vertical hole arranged by drilling the flow-path structure portion 100A from the bottom surface of the outlet port 22L toward the bottom side 16, and penetrates through the side wall of the outer inlet-valve installation hole 32B in the vertical direction to reach the outer outlet-valve installation hole 33B. The third fluid line 53 passes through one side of the cut-valve installation hole 31, and does not communicate with the cut-valve installation hole 31.

Figure 11B:
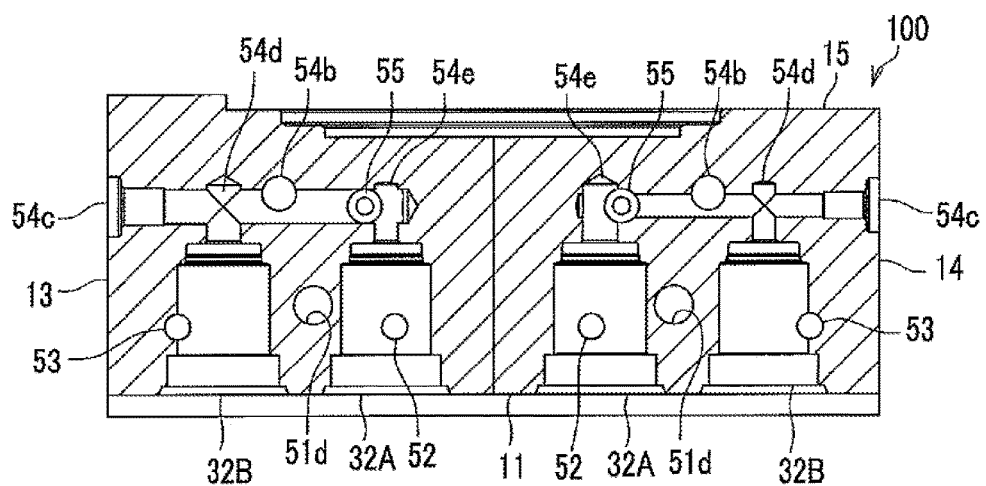
FIG. 11B is a cross-sectional view of the structure of FIG. 2B at the cross section indicated by the line III-III in FIG. 2B.

The cut-valve installation hole 31 is a stepped cylindrical hole having a bottom. The side wall of the cut-valve installation hole 31 communicates with the small-diameter housing portion 35b as illustrated in FIG. 5, and the bottom of the cut-valve installation hole 31 communicates through a fourth fluid line 54 with the inner inlet-valve installation hole 32A and the outer inlet-valve installation hole 32B as illustrated in FIG. 7. The fourth fluid line 54 is constituted by a transversal hole 54a, a vertical hole 54b, a transversal hole 54c, a transversal hole 54e, and a transversal hole 54d. The transversal hole 54a is arranged by drilling the flow-path structure portion 100A from the bottom surface of the cut-valve installation hole 31 toward the rear side 15. The vertical hole 54b is arranged by drilling the flow-path structure portion 100A from the top side 12 toward the rear end of the transversal hole 54a. The transversal hole 54c is arranged by drilling the flow-path structure portion 100A from the right side 14 toward the left side 13. The transversal hole 54e is arranged by drilling the flow-path structure portion 100A from the bottom surface of the inner inlet-valve installation hole 32A toward the transversal hole 54c. The transversal hole 54d is arranged by drilling the flow-path structure portion 100A from the bottom surface of the outer inlet-valve installation hole 32B toward the transversal hole 54c. The transversal hole 54c crosses the vertical hole 54b (as illustrated in FIG. 11B). A fifth fluid line 55 crosses the left end of the transversal hole 54c. The fifth fluid line 55 is realized by a vertical hole arranged by drilling the flow-path structure portion 100A from the top side 12 toward the bottom side 16. The fifth fluid line 55 communicates with the damper hole 37. The fluid line extending from the bottom surface of the cut-valve installation hole 31 through the fourth fluid line 54 to the inner inlet-valve installation hole 32A and the outer inlet-valve installation hole 32B, the fluid line extending from the inner inlet-valve installation hole 32A through the second fluid line 52 (illustrated in FIG. 8) to the outlet port 22R, and the fluid line from the outer inlet-valve installation hole 32B through the third fluid line 53 (illustrated in FIG. 8) to the outlet port 22L correspond to the wheel hydraulic pressure line B illustrated in FIG. 20.

The inner inlet-valve installation hole 32A is a stepped cylindrical hole having a bottom, and the inlet valve 2 corresponding to the wheel brake FR is installed in the inner inlet-valve installation hole 32A. As illustrated in FIGS. 5 and 8, the inner inlet-valve installation hole 32A communicates through the second fluid line 52 with the caliper-pressure-sensor installation hole 39 and the inner outlet-valve installation hole 33A. In addition, as illustrated in FIG. 7, the inner inlet-valve installation hole 32A communicates with the cut-valve installation hole 31 through the fourth fluid line 54, and with the damper hole 37 through the fifth fluid line 55.

The outer inlet-valve installation hole 32B is a stepped cylindrical hole having a bottom, and the inlet valve 2 (illustrated in FIG. 20) corresponding to the wheel brake RL is installed in the outer inlet-valve installation hole 32B. As illustrated in FIGS. 5 and 8, the outer inlet-valve installation hole 32B communicates through the third fluid line 53 with the outer outlet-valve installation hole 33B. Further, as illustrated in FIG. 7, the outer inlet-valve installation hole 32B communicates with the cut-valve installation hole 31 through the fourth fluid line 54, and with the damper hole 37 through the fifth fluid line 55.

The inner outlet-valve installation hole 33A is a stepped cylindrical hole having a bottom, and the outlet valve 3 (illustrated in FIG. 20) corresponding to the wheel brake FR is installed in the inner outlet-valve installation hole 33A. As illustrated in FIG. 7, the inner outlet-valve installation hole 33A communicates with the reservoir hole 35 through a seventh fluid line 57, which extends from the bottom (not shown) of the inner outlet-valve installation hole 33A. The seventh fluid line 57 is realized by a vertical hole arranged by drilling the flow-path structure portion 100A from the bottom surface of the reservoir hole 35 toward the top side 12 so as to reach the bottom of the inner outlet-valve installation hole 33A.

The outer outlet-valve installation hole 33B is a stepped cylindrical hole having a bottom, and the outlet valve 3 (illustrated in FIG. 20) corresponding to the wheel brake RL is installed in the outer outlet-valve installation hole 33B. As illustrated in FIG. 7, the outer outlet-valve installation hole 33B communicates with the reservoir hole 35 through an eighth fluid line 58. The eighth fluid line 58 is realized by a vertical hole arranged by drilling the flow-path structure portion 100A from the bottom surface of the reservoir hole 35 toward the top side 12 so as to reach the bottom of the outer outlet-valve installation hole 33B. In addition, as illustrated in FIG. 8, the outer outlet-valve installation hole 33B communicates through the third fluid line 53 with the outer inlet-valve installation hole 32B and the outlet port 22L. The fluid line extending from the inner outlet-valve installation hole 33A through the seventh fluid line 57 to the reservoir hole 35 and the fluid line extending from the outer outlet-valve installation hole 33B through the eighth fluid line 58 to the reservoir hole 35 correspond to the release line E illustrated in FIG. 20.

The pump bore 36 is a stepped cylindrical hole in which the pump 6 (illustrated in FIG. 20) is installed. The pump bore 36 is formed such that the pump axis (center axis) Y1 of the pump 6 passes through the center of the motor-installation hole 20. In addition, as illustrated in FIG. 7, the pump bore 36 communicates with the damper hole 37 through a sixth fluid line 56. The sixth fluid line 56 is constituted by a vertical hole 56a, a transversal hole 56b, and a transversal hole 56c. The vertical hole 56a is arranged by drilling the flow-path structure portion 100A from the bottom side 16 toward the top side 12. The transversal hole 56b is arranged by drilling the flow-path structure portion 100A from the rear side 15 toward the front side 11. The transversal hole 56c is arranged by drilling the flow-path structure portion 100A from the right side 14 to the left side 13. The top end of the vertical hole 56a crosses the transversal hole 56b. The front end of the transversal hole 56b crosses the transversal hole 56c, and the transversal hole 56c extends to the side wall of the damper hole 37.

The fluid line extending from the pump bore 36 through the sixth fluid line 56 to the damper hole 37 corresponds to the inlet fluid line Da (in the discharge hydraulic pressure line D) illustrated in FIG. 20.

The inlet fluid line Da includes two bent (curved) portions in the middle of the sixth fluid line 56, specifically, a portion at which the vertical hole 56a and the transversal hole 56b cross and a portion at which the transversal hole 56b and the transversal hole 56c cross. The inlet fluid line Da has a function of damping the pulsation of the pump 6.

Figure 10:
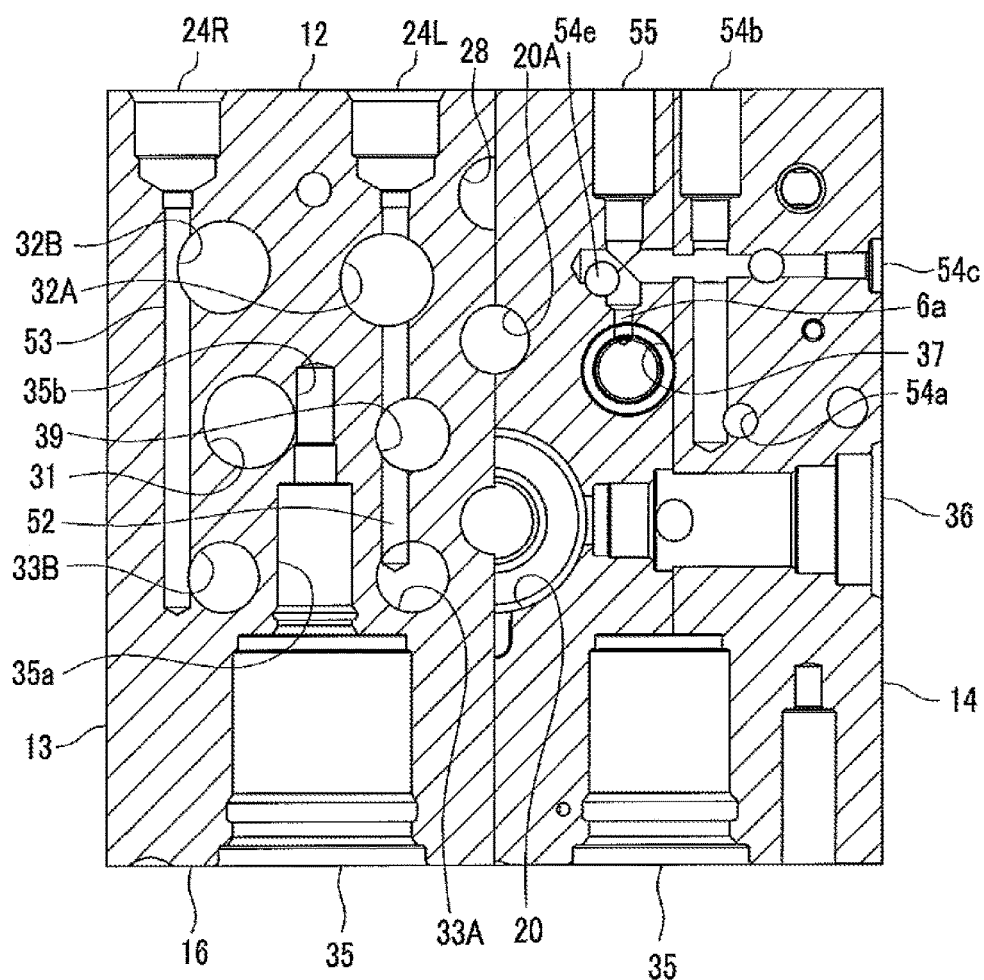
FIG. 10 is a cross-sectional view of the structure of FIG. 2A at the cross section indicated by the line I-I in FIG. 2A.
Figure 13A:
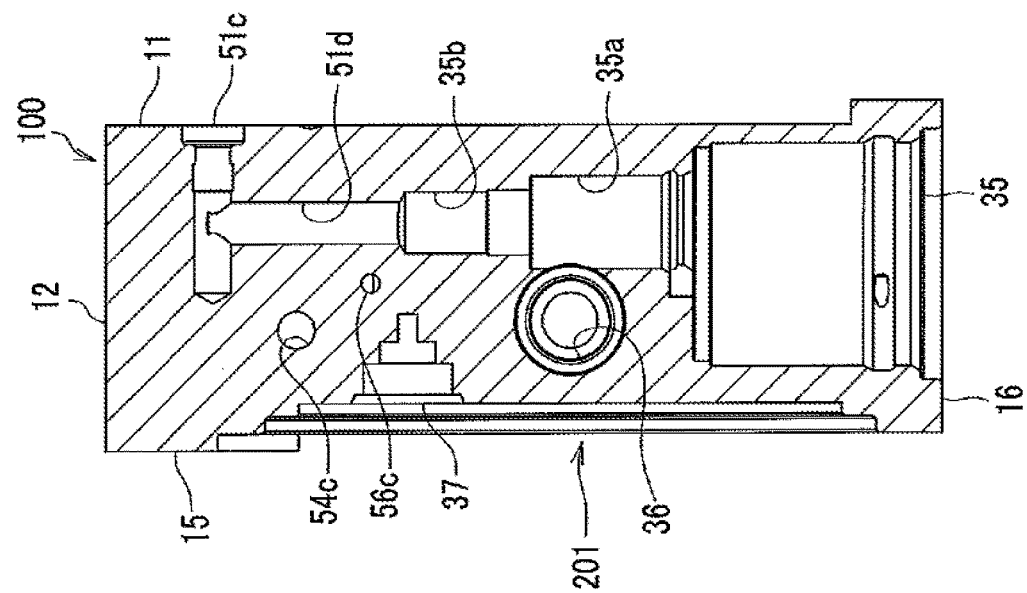
FIG. 13A is a cross-sectional view of the structure of FIG. 3A at the cross section indicated by the line VI-VI in FIG. 3A.

The damper hole 37 is a stepped cylindrical hole having a bottom and being arranged for realizing the damper 7 (illustrated in FIG. 20). As illustrated in FIG. 7, the damper hole 37 communicates with the inner inlet-valve installation hole 32A through the fifth fluid line 55, and with the outer inlet-valve installation hole 32B through the fifth fluid line 55 and the fourth fluid line 54. The fifth fluid line 55 corresponds to the outlet fluid line Db (in the discharge hydraulic pressure line D) illustrated in FIG. 20. As illustrated in FIG. 10 and FIG. 13A, the portion of the fifth fluid line 55 at which the fifth fluid line 55 is connected to the damper hole 37 is arranged to have a diameter smaller than the diameters of the other portions of the fifth fluid line 55. The portion having the smaller diameter realizes the aforementioned orifice 6a (illustrated in FIG. 20). As mentioned before, the orifice 6a has a function of damping the pulsation in cooperation with the damper 7 (illustrated in FIG. 20).

As illustrated in FIG. 14, the opening of the damper hole 37 is sealed up with the damper 7, which is fitted from the rear side 15 of the base body 100. The damper hole 37 sealed up with the damper 7 has a volume sufficient to damp the pulsation caused by the pump 6.

The caliper-pressure-sensor installation hole 39 is a stepped cylindrical hole having a bottom. As illustrated in FIGS. 5 and 8, the caliper-pressure-sensor installation hole 39 communicates with the inlet port 21 through the second fluid line 52, the inner inlet-valve installation hole 32A, and the fourth fluid line 54. In addition, the caliper-pressure-sensor installation hole 39 also communicates with the inner outlet-valve installation hole 33A through the second fluid line 52.

The pump bore 36 is directly connected to (communicates with) the large-diameter housing portion 35a at the side wall of the pump bore 36, and communicates with the inlet port 21 of the first fluid line 51 through the suction valve 4. In addition, as illustrated in FIG. 7, the pump bore 36 communicates with the damper hole 37 through the sixth fluid line 56. The pump 6 installed in the pump bore 36 is arranged to be driven through an eccentric cam fixed to an output shaft (not shown) of the motor 200.

Figure 13B:
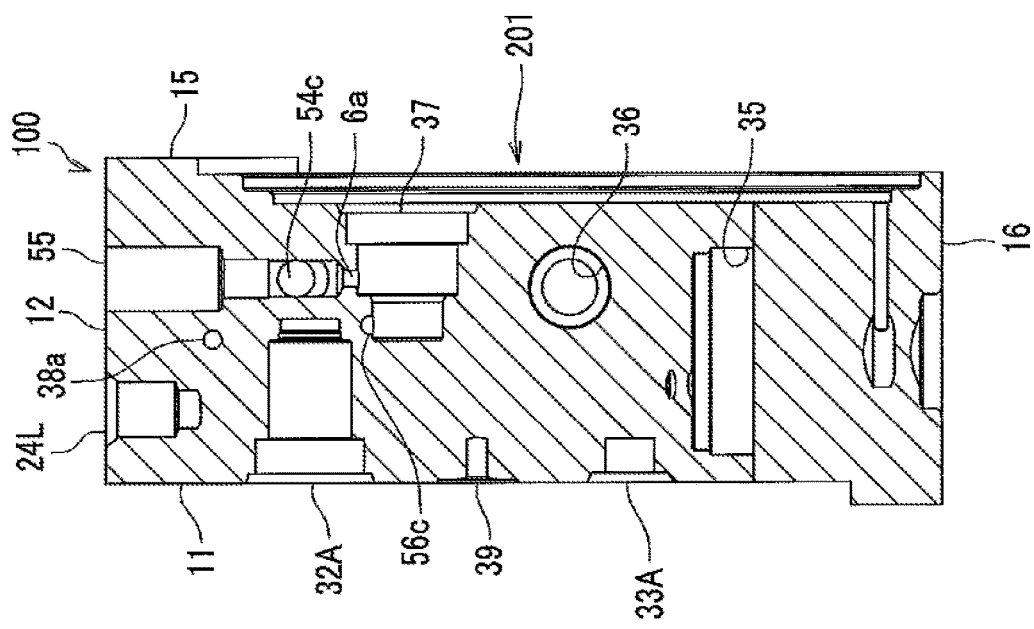
FIG. 13B is a cross-sectional view of the structure of FIG. 3B at the cross section indicated by the line VII-VII in FIG. 3B.

The reservoir hole 35 is a bottomed cylindrical hole, in which the reservoir 5 (illustrated in FIG. 20) is installed. As illustrated in FIG. 13B, the large-diameter housing portion 35a is continuously formed from the bottom of the reservoir hole 35, and the small-diameter housing portion 35b is continuously formed from the bottom of the large-diameter housing portion 35a. The large-diameter housing portion 35a directly communicates with the suction side of the pump bore 36, and the small-diameter housing portion 35b directly communicates with the cut-valve installation hole 31. In addition, the vertical hole 51d in the first fluid line 51 communicates with the bottom of the small-diameter housing portion 35b. That is, the reservoir hole 35, the large-diameter housing portion 35a, the small-diameter housing portion 35b, and the vertical hole 51d in the first fluid line 51 communicate with each other, and are integrally formed in the stepped cylindrically shape in the base body 100.

In the present embodiment, as illustrated in FIG. 5, the inner inlet-valve installation hole 32A and the outer inlet-valve installation hole 32B are respectively arranged on the left and right sides of the vertical hole 51d in the first fluid line 51, the caliper-pressure-sensor installation hole 39 and the cut-valve installation hole 31 are respectively arranged on the left and right sides of the small-diameter housing portion 35b, which is located below the vertical hole 51d in the first fluid line 51. In addition, the inner outlet-valve installation hole 33A and the outer outlet-valve installation hole 33B are respectively arranged on the left and right sides of the large-diameter housing portion 35a, which is located below the small-diameter housing portion 35b. That is, the respective installation holes are arranged at the close positions on the left and right sides of the vertical hole 51d, the small-diameter housing portion 35b, and the large-diameter housing portion 35a, and therefore the fluid lines are shortened and simplified. Therefore, the fluid lines can be simply laid out, so that the base body 100 can be downsized.

In addition, the second fluid line 52, which communicates with the outlet port 22R, is arranged on the left side of the vertical hole 51d, the small-diameter housing portion 35b, and the large-diameter housing portion 35a, parallel to the vertical hole 51d, the small-diameter housing portion 35b, and the large-diameter housing portion 35a, which are arranged in the vertical direction. In addition, the third fluid line 53, which communicates with the outlet port 22L, is arranged on the left side of the vertical hole 51d, the small-diameter housing portion 35b, and the large-diameter housing portion 35a, parallel to the vertical hole 51d, the small-diameter housing portion 35b, and the large-diameter housing portion 35a. Therefore, the communication between the respective installation holes in the vertical direction is facilitated by use of the second fluid line 52 and the third fluid line 53. The above arrangement, together with the arrangement of the respective installation holes at the close positions on the left and right sides of the vertical series of the vertical hole 51d, the small-diameter housing portion 35b, and the large-diameter housing portion 35a, enables preferable length reduction and simplification of the fluid lines. Further, since each of the fluid line from the vertical hole 51d to the reservoir hole 35 in the vertical direction, the second fluid line 52, and the third fluid line 53 is arranged along a straight line, the fluid lines can be easily formed, and the manufacturing cost of the base body 100 can be reduced.

As illustrated in FIG. 2B, the hydraulic pressure source-side sensor installation hole 38 is a bottomed cylindrical hole, and formed in a central portion of the base body 100 (i.e., at the boundary between the flow-path structure portions 100A and 100B) to bestride the flow-path structure portions 100A and 100B. As illustrated in FIG. 6, the hydraulic pressure source-side sensor installation hole 38 communicates with the transversal hole 51c in the first fluid line 51 through the transversal holes 38b and 38a, and with the inlet port 21 through the transversal holes 51b and 51a.

As illustrated in FIG. 3A, the motor-installation hole 20 has the shape of a stepped cylindrical hole with a bottom, is open in approximately a central portion of the rear side 15 of the base body 100. The motor-installation hole 20 is arranged to allow insertion of the output shaft (not shown) of the motor 200. As illustrated in FIG. 12B, the pump bore 36 is open on the side wall of the motor-installation hole 20, and a ball bearing (not shown) for pressing a plunger which is provided in the pump 6 and engaged with an eccentric shaft portion of the output shaft is housed in a vicinity of the opening of the pump bore 36. The installation hole 20A, to which the power-supply terminal 203 (illustrated in FIG. 14) of the motor 200 is to be attached, is formed above the motor-installation hole 20, and penetrates through the base body 100 in the front-rear direction (as illustrated in FIG. 12A).

When the base body 100 is divided, by a reference plane containing the pump axis (shaft center) Y1 of the pump 6 and the shaft center O1 of the output shaft (not shown) of the motor 200, into two regions, an upper region and a lower region, according to the present embodiment, the damper hole 37, the inner inlet-valve installation hole 32A, the outer inlet-valve installation hole 32B, the caliper-pressure-sensor installation hole 39, and the cut-valve installation hole 31 are arranged on one region (i.e., the upper region). Resultantly, the damper 7, the inlet valves 2, the caliper-pressure sensor 9, and the cut valve 1 are arranged in the region above the reference plane, and the first fluid line 51, the fourth fluid line 54, the fifth fluid line 55, and the sixth fluid line 56 are also integrated in the region above the reference plane. Thus, it is possible to achieve the arrangement in which the space in the upper region of the base body 100 is effectively used.

In addition, as illustrated in FIG. 5, the large-diameter housing portion 35a (the suction valve 4) is arranged between the inner outlet-valve installation hole 33A and the outer outlet-valve installation hole 33B, and the reservoir hole 35 is formed close to and below the inner outlet-valve installation hole 33A and the outer outlet-valve installation hole 33B. Therefore, the outlet valves 3 and the reservoir 5 can be connected by a minimized number of fluid lines (the seventh fluid line 57 and the eighth fluid line 58), and no installation hole is needed for installation of the suction valve 4. Consequently, the layout of the fluid lines can be simplified, and the base body 100 can be downsized.

Further, the large-diameter housing portion 35a is directly connected to the pump bore 36, and the small-diameter housing portion 35b is directly connected to the cut-valve installation hole 31. Therefore, formation and arrangement of the installation holes and the fluid lines can be achieved by effectively using the space around the pump bore 36 and the cut-valve installation hole 31. Thus, the space for formation of the inlet fluid line Da and the outlet fluid line Db mentioned before can be secured above the pump bore 36.

The control housing 300 illustrated in FIG. 1 is integrally fixed with the mounting screws (not shown) to mounting holes 11a arranged on the front side 11 of the base body 100 (illustrated in FIG. 2B) in such a manner that the control housing 300 covers the master-pressure sensor 8 and the caliper-pressure sensor 9. Electromagnetic coils (not shown) for actuating the solenoid valves installed in the base body 100 are attached to support plates and the like which are arranged inside the above control housing 300.

The control unit 400 illustrated in FIG. 1 is realized by mounting semiconductor chips and the like on a circuit board on which electronic circuits are printed. The control unit 400 controls the opening and closing of each of the aforementioned solenoid valves and operation of the motor 200 on the basis of information obtained from various sensors such as the master-pressure sensor 8, the caliper-pressure sensor 9, the wheel speed sensor (not shown), programs stored in advance, and other information.

Next, flows of the brake fluid when normal braking, antilock braking control, and vehicle behavior control are performed are explained in detail.

Figure 17:
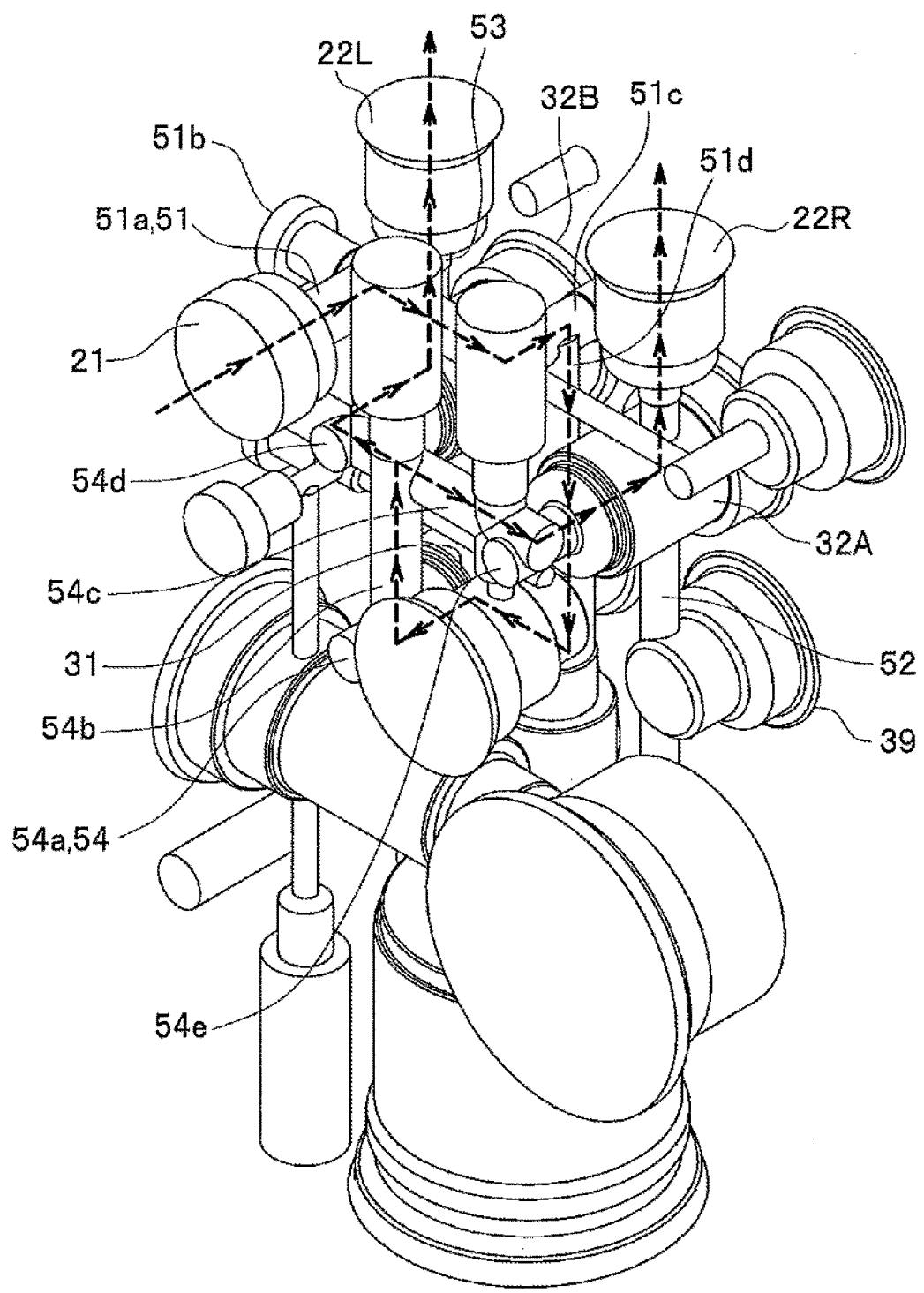
FIG. 17 is a transparent view, from the upper rear side, of a portion of the base body, which is presented for illustration of the flow of brake fluid.

<Normal Braking> As explained before, in normal braking, the suction valve 4 is closed, and the normally-open solenoid valve functioning as the cut valve 1 is open. Therefore, as illustrated in FIG. 17, the brake fluid flowing from the inlet port 21 passes through the first fluid line 51, flows into the cut-valve installation hole 31, passes through the opened solenoid valve, and flows into the fourth fluid line 54. Then, the brake fluid flowing into the fourth fluid line 54 flows from the fourth fluid line 54 into the bottom of the inner inlet-valve installation hole 32A, and into the bottom of the outer inlet-valve installation hole 32B. The brake fluid flowing into the inner inlet-valve installation hole 32A passes through the normally-open solenoid valve as the inlet valve 2, and flows into the second fluid line 52 through the inlet valve 2 since the inlet valve 2 is open. Then, the brake fluid passes through the outlet port 22R, and reaches the wheel brake FR. Similarly, the brake fluid flowing into the outer inlet-valve installation hole 32B passes through the normally-open solenoid valve as the inlet valve 2, and flows into the third fluid line 53 (illustrated in FIG. 5) since the inlet valve 2 is open. Then, the brake fluid passes through the outlet port 22L, and reaches the wheel brake FL.

At this time, the brake fluid flowing from the inlet port 21 into the first fluid line 51 flows from the first fluid line 51 (illustrated in FIG. 6) through the transversal hole 38a and 38b into the hydraulic pressure source-side sensor installation hole 38. In addition, the master-pressure sensor 8 measures the brake hydraulic pressure in the master cylinder M, and the measured value of the brake hydraulic pressure is taken into the control unit 400 when necessary. In addition, the brake fluid flowing into the second fluid line 52 (which extends to the front right wheel brake FR) flows into the caliper-pressure-sensor installation hole 39. Then, the caliper-pressure sensor 9 measures the brake hydraulic pressure in the wheel hydraulic pressure line B, and the measured value of the brake hydraulic pressure is taken into the control unit 400 when necessary.

Figure 18:
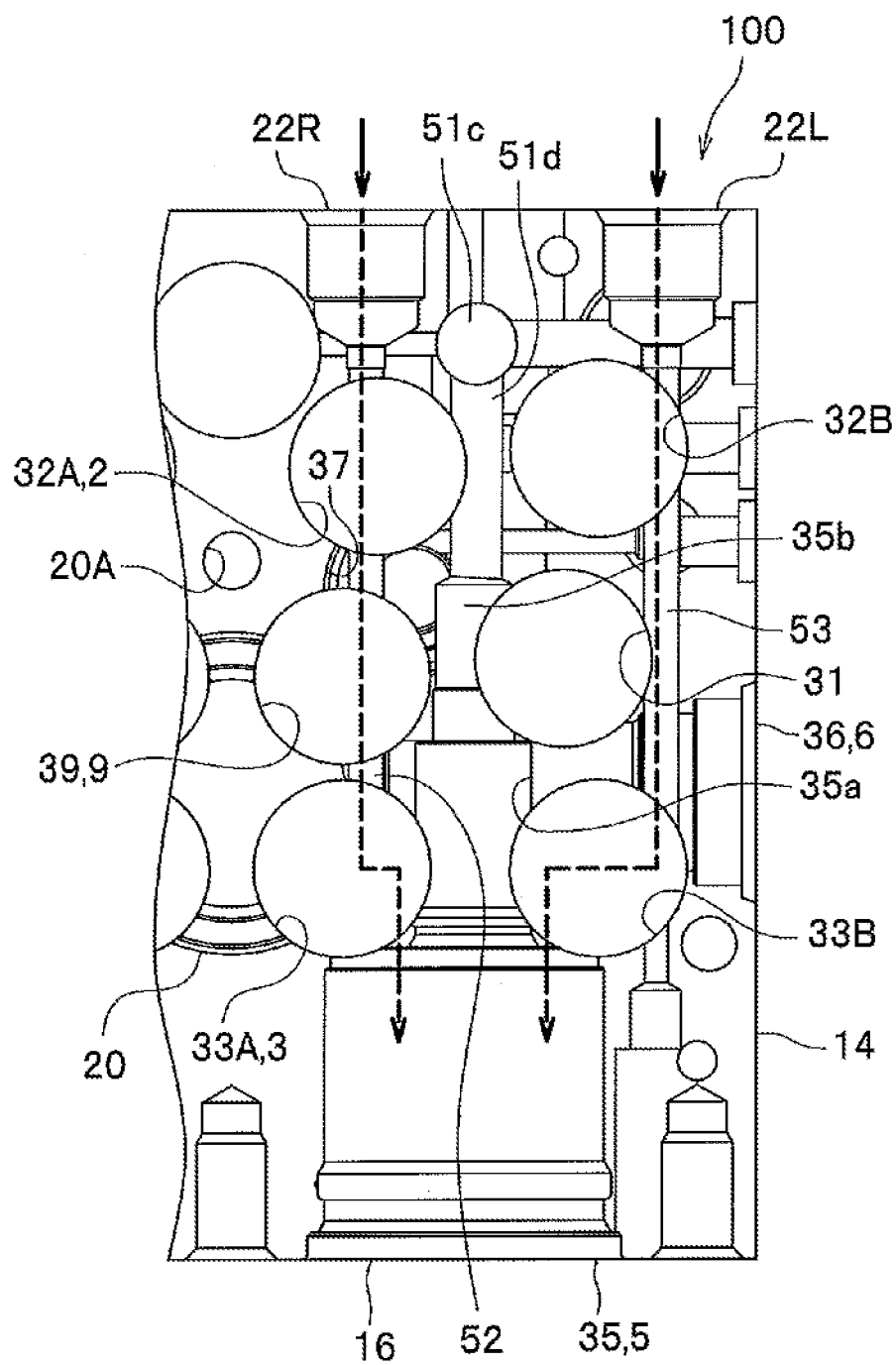
FIG. 18 is a transparent view, from the front side, of a portion of the base body, which is presented for illustration of the flow of brake fluid.

<Antilock Braking Control> In the case where, for example, the brake hydraulic pressure applied to the wheel brake FR (illustrated in FIG. 20) is reduced by antilock braking control, the control unit 400 (illustrated in FIG. 1) closes the inlet valve 2 corresponding to the wheel brake FR, and opens the outlet valve 3, as explained before. Then, the brake fluid acting on the wheel brake FR passes through the outlet port 22R and the second fluid line 52 and flows into the inner inlet-valve installation hole 32A as illustrated in FIG. 18. At this time, the normally-open solenoid valve as the inlet valve 2 in the inner inlet-valve installation hole 32A is closed. Therefore, the brake fluid does not flow into the fourth fluid line 54 (illustrated in FIG. 7). Instead, the brake fluid passes through the gap between the side wall of the inner inlet-valve installation hole 32A and the outer circumferential surface of the solenoid valve, flows into the second fluid line 52 located below, and flows into the inner outlet-valve installation hole 33A through the second fluid line 52.

The brake fluid flowing into the inner outlet-valve installation hole 33A flows through the normally-closed solenoid valve as the outlet valve 3 since the outlet valve 3 is open. Then, the brake fluid flows into the seventh fluid line 57 (illustrated in FIG. 7) and then into the reservoir hole 35 (the reservoir chamber 5*d*).

Figure 15:
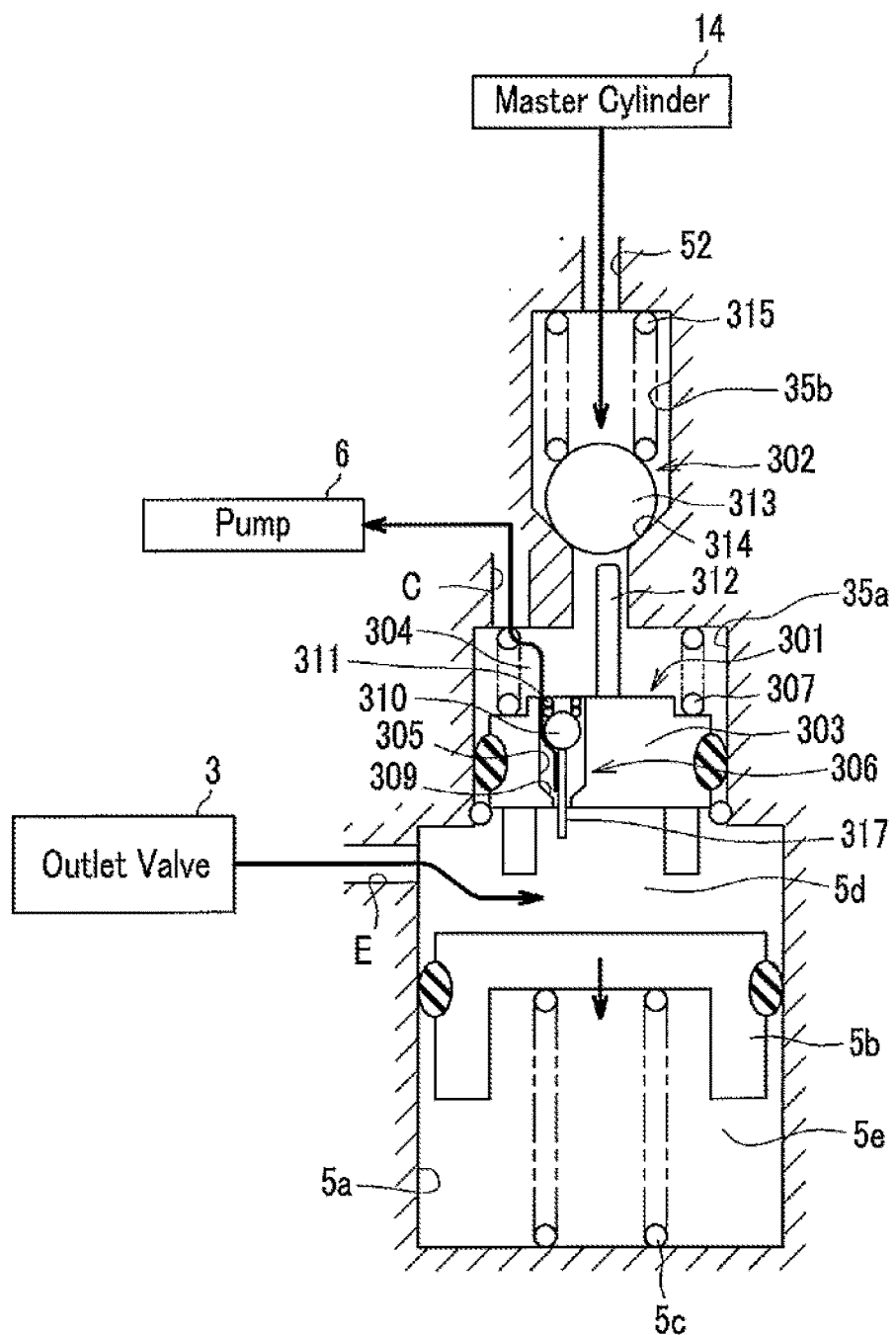
FIG. 15 is an explanatory diagram illustrating operations of the suction valve and the reservoir.

At this time, the openable pressure of the open-close valve 306 arranged in the intermediate piston 303 is set low. Therefore, as illustrated in FIG. 15, the valve element 310 comes apart from the seat portion 309 against the spring force of the valve spring 311, and therefore the open-close valve 306 is quickly opened.

Therefore, the brake fluid flowing into the reservoir chamber 5*d* flows into the pump suction chamber 304 through the communication path 305 of the open-close valve 306. The brake fluid flowing into the pump suction chamber 304 is fed to the pump 6, which is directly connected to the large-diameter housing portion 35*a*. When the valve element 310 is opened, no pressure difference occurs between the brake hydraulic pressure in the pump suction chamber 304 and the brake hydraulic pressure in the reservoir chamber 5*d* (i.e., between the upstream side and the downstream side of the intermediate piston 303). That is, the brake hydraulic pressure in the pump suction chamber 304 and the brake hydraulic pressure in the reservoir chamber 5*d* are exactly or approximately equal. Therefore, the intermediate piston 303 is not displaced, and is kept at rest.

As explained before, the reservoir piston 5*b* is displaced downward (i.e., in the direction in which the volume of the reservoir chamber 5*d* is increased) by being pressed by the brake fluid flowing into the reservoir chamber 5*d*, so that a predetermined amount of brake fluid is reserved in the reservoir chamber 5*d*. In addition, the atmospheric-pressure chamber 5*e*, which is arranged below the reservoir piston 5*b*, communicates with the atmosphere through the aspiration path (not shown), so that the pressure in the atmospheric-pressure chamber 5*e* is the atmospheric pressure.

Further, when the pump 6 is driven on the basis of a control signal from the control unit 400, the pressure on the upstream side of the intermediate piston 303 (i.e., the brake hydraulic pressure in the reservoir piston 5*b*) and the pressure on the downstream side of the intermediate piston 303 (i.e., the brake hydraulic pressure in the pump suction chamber 304) become approximately equal, or the pressure on the downstream side becomes lower than the pressure on the upstream side. Therefore, the open-close valve 306 is kept open at all times, and the intermediate piston 303 is kept at rest. Thus, the brake fluid reserved in the reservoir chamber 5*d* can be stably drawn up by the pump 6.

Figure 19:
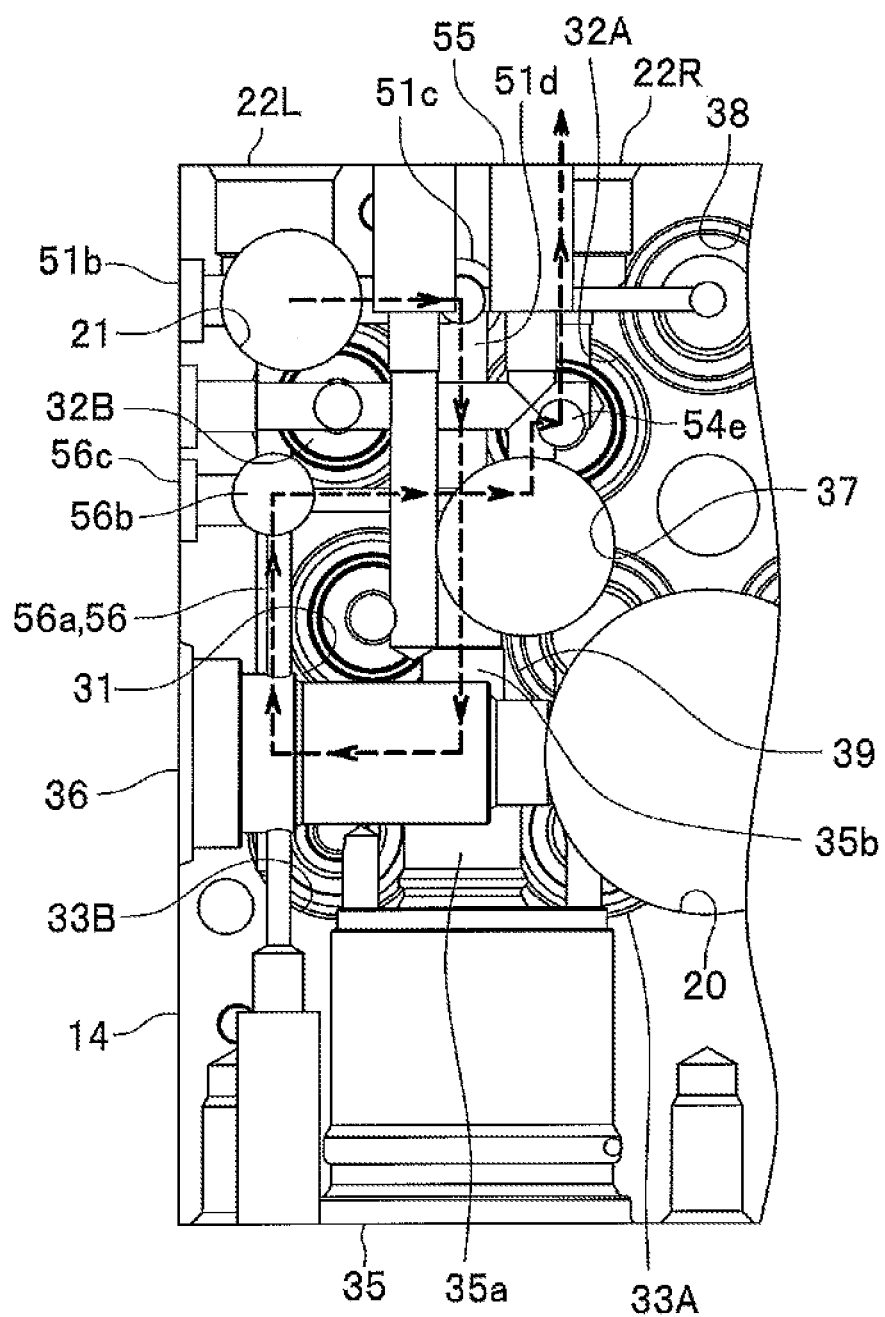
FIG. 19 is a transparent view, from the rear side, of a portion of the base body, which is presented for illustration of the flow of brake fluid.

As illustrated in FIG. 19, the brake fluid discharged from the pump 6 to the sixth fluid line 56 flows into the damper hole 37, and then flows from the damper hole 37 into the fifth fluid line 55. During the above operations, the pulsation caused by the pump 6 can be preferably damped by cooperation of the damper 7 and the orifice 6*a* (illustrated in FIG. 20), which is arranged in the fifth fluid line 55.

In addition, in the case where the brake hydraulic pressure applied to the wheel brake RL (illustrated in FIG. 20) is reduced, the brake fluid passes through the outlet port 22L and the third fluid line 53 and flows into the outer inlet-valve installation hole 32B as illustrated in FIG. 18. At this time, the normally-open solenoid valve as the inlet valve 2 in the outer inlet-valve installation hole 32B is closed. Therefore, the brake fluid does not flow into the fourth fluid line 54 (illustrated in FIG. 7). Instead, the brake fluid passes through the gap between the side wall of the inner inlet-valve installation hole 32A and the outer circumferential surface of the solenoid valve, flows into the third fluid line 53 located below, and flows into the outer outlet-valve installation hole 33B through the third fluid line 53. Then, the brake fluid flows through the solenoid valve (the outlet valve 3), which is open. Then, the brake fluid flows into the eighth fluid line 58 (illustrated in FIG. 7) and then into the reservoir hole 35.

Further, as illustrated in FIG. 7, the inner outlet-valve installation hole 33A and the reservoir hole 35 are arranged close to each other, and connected through the single seventh fluid line 57. Therefore, smooth inflow of the brake fluid from the inner outlet-valve installation hole 33A to the reservoir hole 35 is achieved. Similarly, the outer outlet-valve installation hole 33B and the reservoir hole 35 are arranged close to each other, and connected through the single eighth fluid line 58. Therefore, smooth inflow of the brake fluid from the outer outlet-valve installation hole 33B to the reservoir hole 35 is achieved.

Next, in the case where the brake hydraulic pressure applied to the wheel brake FR (illustrated in FIG. 20) is kept constant by antilock braking control, the inlet valve 2 and the outlet valve 3 are closed by the control unit 400 as explained before. Therefore, neither inflow of the brake fluid to the second fluid line 52 nor outflow of the brake fluid from the second fluid line 52 occurs. Thus, the brake hydraulic pressure applied to the wheel brake FR (illustrated in FIG. 20) is kept constant.

In addition, in the case where the brake hydraulic pressure applied to the wheel brake FR (illustrated in FIG. 20) is increased by antilock braking control, the control unit 400 opens the inlet valve 2 and closes the outlet valve 3 as explained before. Therefore, the flow of the brake fluid is the same as the case of normal braking.

Further, since the caliper-pressure sensor 9 is installed in the caliper-pressure-sensor installation hole 39, which communicates through the second fluid line 52 with the outlet port 22L connected to the wheel brake FR, the brake hydraulic pressure in the wheel hydraulic pressure line B which is connected to the wheel brake FR can be actually measured when the antilock braking control as above is performed. Therefore, the control unit 400 can perform fine control of the hydraulic pressure according to the measured brake hydraulic pressure, and the brake hydraulic pressure which is most suitable for the wheel brake FR can be easily achieved with high reliability. Thus, the traffic-congestion follow-up control can be performed with high responsiveness.

In addition, since the brake hydraulic pressure applied to the wheel brakes FR and FL for the front wheels, on which heavy braking load is imposed, is measured by the caliper-pressure sensor 9, it is possible to perform control of the brake hydraulic pressure while laying weight on the braking force control. Further, in the case where the front wheels are driving wheels, it is possible to perform control of the brake hydraulic pressure while laying weight also on the traction control.

Figure 16A:
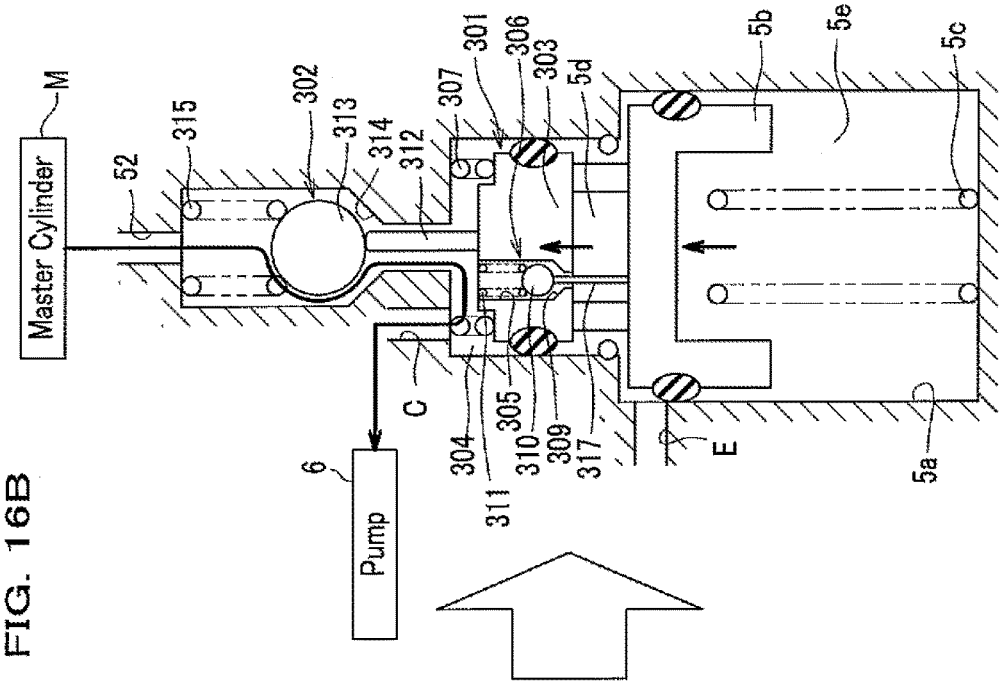
FIGS. 16A and 16B are explanatory diagrams illustrating operations of the suction valve and the reservoir.
Figure 16B:
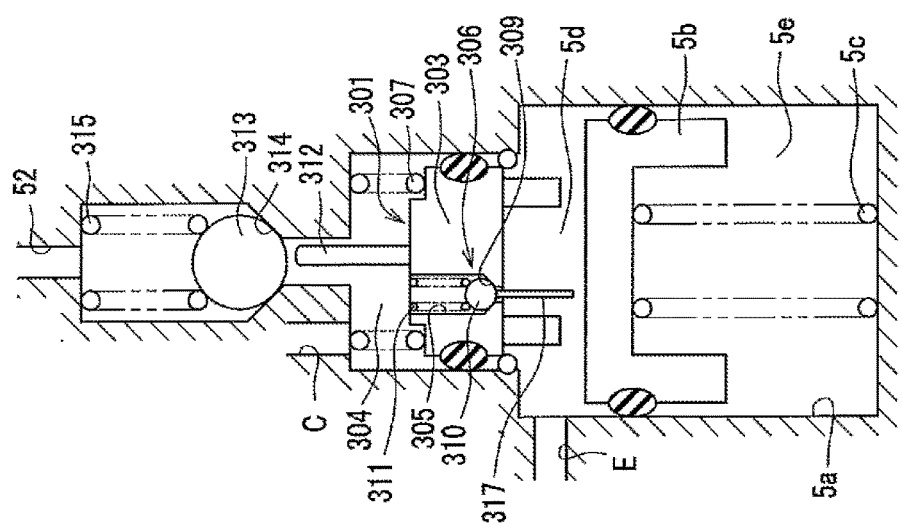

<Vehicle Behavior Control> In the case where, for example, the wheel brake FR (illustrated in FIG. 20) is braked in the vehicle behavior control, as explained before, the cut valve 1 is closed by the control unit 400, and the pump 6 (illustrated in FIG. 20) is driven by operation of the motor 200. When the pump 6 is driven, the suction valve 4 transitions from the state illustrated in FIG. 16A to the state illustrated in FIG. 16B, in which the pump suction chamber 304 is brought into a negative pressure state through the suction hydraulic pressure line C. At the same time, the valve element 310 in the open-close valve 306 arranged in the intermediate piston 303 is also suctioned to be separated from the valve sheet 309, so that the open-close valve 306 is opened. Thus, the brake fluid in the reservoir chamber 5*d* is drawn out through the communication path 305, so that the reservoir chamber 5*d* is also brought into a negative pressure state.

In the above case, the reservoir chamber 5*d* is in the negative pressure state while the atmospheric-pressure chamber 5*e* is at the atmospheric pressure. That is, a pressure difference occurs, and causes displacement (rise) of the reservoir piston 5*b* toward the intermediate piston 303 side (upward). The intermediate piston 303 is also displaced in association with the displacement of the reservoir piston 5*b*, so that the tip end of the pressing member 312 arranged on the intermediate piston 303 comes into contact with the ball 313 in the upper valve 302. When the ball 313 is pressed by the pressing member 312 and separated from the seat portion 314, the upper valve 302 is opened. Thus, the brake fluid flows from the master cylinder M into the pump suction chamber 304, and fed to the pump 6 side. (See the bold arrows in FIG. 16B.)

In addition, as illustrated in FIG. 19, the brake fluid in the pump bore 36 is discharged to the sixth fluid line 56. The brake fluid discharged into the sixth fluid line 56 flows into the damper hole 37, and flows from the damper hole 37 through the fifth fluid line 55 and the fourth fluid line 54 (the transversal hole 54*e*) into the inner inlet-valve installation hole 32A. During the above operations, the pulsation caused by the pump 6 is preferably damped by cooperation of the damper 7 and the orifice 6*a*, which are arranged in the fifth fluid line 55. Then, the brake fluid passes through the solenoid valve as the inlet valve 2 in the inner inlet-valve installation hole 32A, flows into the second fluid line 52 (illustrated in FIG. 5), passes through the outlet port 22R, and reaches the wheel brake FR.

Even when the vehicle behavior control as above is performed, the brake hydraulic pressure in the wheel hydraulic pressure line B connected to the front right wheel brake FR can be actually measured by the caliper-pressure sensor 9. Therefore, the control unit 400 can finely control of the hydraulic pressure such that the brake hydraulic pressure in the wheel hydraulic pressure line B becomes a desired pressure. Thus, the control unit 400 can perform braking control with high accuracy.

In the brake hydraulic pressure control apparatus U including the positional relationships explained in detail as above, the pair of cut valves 1 (and the cut-valve installation holes 31) are arranged in a line in the direction along the pump axis Y1, and the pair of caliper-pressure sensors 9 (and the caliper-pressure-sensor installation hole 39) are also arranged in a line in the direction along the pump axis Y1. In addition, the plurality of inlet valves 2 (and the inner inlet-valve installation holes 32A and the outer inlet-valve installation holes 32B) are arranged in a line in the direction along the pump axis Y1, and the plurality of outlet valves 3 (the inner outlet-valve installation holes 33A and the outer outlet-valve installation holes 33B) are also arranged in a line in the direction along the pump axis Y1. Further, the pair of mechanical suction valves 4 are arranged between the outlet valves 3 which are adjacent on an edge side of the base body 100. Therefore, sensors and valves can be arranged by effectively using the space between the outlet valves 3, and the dimension of the base body 100 in the vertical direction can be reduced.

Further, the pair of cut valves 1 are arranged at the positions nearer to the central portion of the base body 100 than the inlet valves 2 and the outlet valves 3 which are arranged on the edge sides of the base body 100. Therefore, it is possible to avoid the arrangement in which the position of the pair of cut valves 1 are aligned, in the vertical direction, with the inlet valves 2 and the outlet valves 3. Thus, the dimension of the base body 100 in the vertical direction can be reduced.

Furthermore, the master-pressure sensor 8 is arranged on the reference line X above ones of the inlet valves 2 which are relatively near to the central portion of the base body 100 and adjacent to each other. Therefore, the space in the upper region of the base body 100 can be saved, and the dimension of the base body 100 in the vertical direction can be reduced.

Moreover, the caliper-pressure sensors 9 are arranged to cross the second fluid lines 52, where the second fluid lines 52 are fluid lines to the outlet port 22R and 24L, which are ones of the outlet ports located relatively near to the central portion of the base body 100. Therefore, it is possible to make the caliper-pressure sensors 9 directly communicate with the second fluid lines 52. Thus, the fluid lines can be simplified, so that the base body 100 can be downsized. In addition, the simplification of the fluid lines enables cost reduction.

Further, the pair of suction valves 4 are each provided with the large-diameter housing portion 35*a* and the small-diameter housing portion 35*b*, the large-diameter housing portions 35*a* are respectively connected directly to the pumps 6, and the small-diameter housing portions 35*b* are respectively connected directly to the cut valves 1. Therefore, fluid lines between the pair of suction valves 4 and the pair of pumps 6 and between the pair of suction valves 4 and the pair of cut valves 1 can be dispensed with, so that the fluid lines can be simplified and the base body 100 can be downsized.

Furthermore, the damper 7 can be arranged by effectively using part of the mounting face 201 of the motor 200 as a dead space of the base body 100. Therefore, the base body 100 can be downsized, and silence during normal range control can be achieved by the damper effect.

Moreover, since the damper 7 is arranged on the region of the mounting face 201 sealed with the sealing member 202, the damper 7 is hidden by the mounting of the motor 200. Therefore, surface processing of the sealing plug of the damper 7 is unnecessary, so that the cost of the damper 7 can be reduced.

In addition, since the two vertical holes 54*b* and 56*a* connected to the damper 7 can be formed from respectively different (top and bottom) sides of the base body 100, the vertical holes 54*b* and 56*a* can be easily formed, and the fluid lines around the damper 7 can be simplified.

Although the front-wheel drive vehicle is taken as an example in the above explanations on the present embodiment, the present invention can also be naturally applied to the rear-wheel drive vehicles and four-wheel drive vehicles. In the case of the rear-wheel drive vehicles, control of the brake hydraulic pressure in which weight is laid on the traction control can be performed by measuring with the caliper-pressure sensors 9 the brake hydraulic pressure applied to the wheel brakes RL and RR for the rear wheels as the driving wheels. On the other hand, control of the brake hydraulic pressure in which weight is laid on the braking force control can be performed by measuring with the caliper-pressure sensors 9 the brake hydraulic pressure applied to the wheel brakes FR and FL for the front wheels. In the case of the four-wheel drive vehicles, control of the brake hydraulic pressure in which weight is laid on both of the traction control and the braking force control can be performed by measuring with the caliper-pressure sensors 9 the brake hydraulic pressure applied to the wheel brakes FR and FL for the front wheels.

LIST OF REFERENCES

U: Vehicular Brake Hydraulic Pressure Control Apparatus (Brake hydraulic pressure Control Apparatus)1: Cut Valve2: Inlet Valve (Pressure-increasing Valve)3: Outlet Valve (Pressure-reducing Valve)4: Suction Valve5: Reservoir6: Pump6a: Orifice7: Damper8: Master-Pressure Sensor9: Caliper-pressure Sensorll: Front Side (One Side, Valve-mounting Side)15: Rear Side (Another Side, Motor-mounting Side)21, 23: Inlet Ports22R, 22L, 24L, 24R: Outlet Ports35a: Large-diameter Housing Portion35b: Small-diameter Housing Portion100: Base Body200: MotorO1: Shaft Center (Rotational Axis of the Motor)Y1: Pump Axis (Center of Pump Shaft)FR, RL, FL, RR: Wheel Brakes M: Master Cylinder (Hydraulic Pressure Source)R: Regulator

The invention claimed is:

1. A vehicular brake hydraulic pressure control apparatus, comprising:
a base body;
a plurality of pressure-increasing valves;
a plurality of pressure-reducing valves;
a master-pressure sensor;
a pair of reservoirs;
a pair of cut valves;
a pair of pumps;
a pair of mechanical suction valves;
a pair of caliper-pressure sensors; and
a motor; wherein
one side of the base body is a valve-mounting side on which the plurality of pressure-increasing valves, the plurality of pressure-reducing valves, the pair of cut valves, and the pair of caliper-pressure sensors are mounted, and another side of the base body opposite to the one side is a motor-mounting side on which the motor is mounted;
the plurality of pressure-increasing valves are arranged in a line in a direction of center axes of the pumps, the plurality of pressure-reducing valves are arranged in a line in the direction of the center axes of the pumps, and the pair of cut valves and the pair of caliper-pressure sensors are arranged in a line in the direction of the center axes of the pumps;
when a direction perpendicular to the direction of the center axes of the pumps and a rotational center axis of the motor is a vertical direction, an inlet port from a hydraulic pressure source and a plurality of outlet ports to be connected to a plurality of wheel brakes are arranged in an upper portion of the base body, and the pair of reservoirs are arranged in a lower portion of the base body, where the lower portion is located opposite to the upper portion with respect to the center axes of the pumps;
the pair of pumps are respectively arranged between the inlet port and the reservoirs;
the plurality of pressure-increasing valves are respectively arranged above the center axes of the pumps;
the plurality of pressure-reducing valves are respectively arranged below the plurality of pressure-increasing valves;
the pair of cut valves are respectively arranged between the pressure-increasing valves and the pressure-reducing valves, and are located nearer to a central portion of the base body than ones of the pressure-increasing valves and ones of the pressure-reducing valves located on edge sides of the base body;
the pair of the mechanical suction valves are each arranged between ones of the pressure-reducing valves which are arrayed in the direction of the center axes of the pumps on an edge side of a vertical reference line passing through the rotational center axis, and the pair of mechanical suction valves respectively communicate with the pair of cut valves; and
the master-pressure sensor is arranged on the vertical reference line above ones of the pressure-increasing valves located adjacent to each other, in the direction of the center axes of the pumps, in a central portion of the base body.

2. The vehicular brake hydraulic pressure control apparatus according to claim 1, wherein the pair of mechanical suction valves each include a large-diameter housing portion and a small-diameter housing portion, the large-diameter housing portion is directly connected to one of the pumps, and the small-diameter housing portion is directly connected to one of the cut valves.

3. The vehicular brake hydraulic pressure control apparatus according to claim 1, further comprising a damper connected to the pumps, wherein the damper is arranged on the motor-mounting side.

4. The vehicular brake hydraulic pressure control apparatus according to claim 3, wherein the motor is sealed to the motor-mounting side with a sealing member, and the damper is arranged in a region of the motor-mounting side which is sealed with the sealing member.

5. The vehicular brake hydraulic pressure control apparatus according to claim 3, wherein the damper is arranged nearer to the inlet port than the center axes of the pumps, a portion of a fluid line connecting the pumps and the damper is formed from a bottom side of the base body toward a top side of the base body, and a portion of a fluid line connecting the damper and the cut valves is formed from the top side of the base body toward the bottom side of the base body.

6. The vehicular brake hydraulic pressure control apparatus according to claim 1, wherein the pair of caliper-pressure sensors are arranged to cross fluid lines of ones of the outlet ports which are arranged near to a central portion of the base body.

7. The vehicular brake hydraulic pressure control apparatus according to claim 6, wherein the pair of mechanical suction valves each include a large-diameter housing portion and a small-diameter housing portion, the large-diameter housing portion is directly connected to one of the pumps, and the small-diameter housing portion is directly connected to one of the cut valves.

8. The vehicular brake hydraulic pressure control apparatus according to claim 6, further comprising a damper connected to the pumps, wherein the damper is arranged on the motor-mounting side.

9. The vehicular brake hydraulic pressure control apparatus according to claim 2, further comprising a damper connected to the pumps, wherein the damper is arranged on the motor-mounting side.

10. The vehicular brake hydraulic pressure control apparatus according to claim 4, wherein the damper is arranged nearer to the inlet port than the center axes of the pumps, a portion of a fluid line connecting the pumps and the damper is formed from a bottom side of the base body toward a top side of the base body, and a portion of a fluid line connecting the damper and the cut valves is formed from the top side of the base body toward the bottom side of the base body.

* * * * *